United States Patent [19]

Catiller et al.

[11] 4,374,418
[45] Feb. 15, 1983

[54] LINEAR MICROSEQUENCER UNIT COOPERATING WITH MICROPROCESSOR SYSTEM HAVING DUAL MODES

[75] Inventors: Robert D. Catiller, Garden Grove; Brian K. Forbes, Huntington Beach, both of Calif.

[73] Assignee: Burroughs Corporation, Detroit, Mich.

[21] Appl. No.: 240,867

[22] Filed: Mar. 5, 1981

Related U.S. Application Data

[63] Continuation-in-part of Ser. No. 52,479, Jun. 27, 1979, Pat. No. 4,287,560.

[51] Int. Cl.³ .................. G06F 3/04; G06F 9/30; G06F 13/00; G06F 9/00
[52] U.S. Cl. ........................................ 364/200
[58] Field of Search ... 364/200 MS File, 900 MS File

[56] References Cited

U.S. PATENT DOCUMENTS

| | | | |
|---|---|---|---|
| 3,297,996 | 1/1967 | Grady | 364/200 |
| 3,325,788 | 6/1967 | Hackl | 364/200 |
| 3,614,740 | 10/1971 | De Lagi | 364/200 |
| 3,614,741 | 10/1971 | McFardland, Jr. et al. | 364/200 |
| 4,106,092 | 8/1978 | Millers | 364/200 |
| 4,109,310 | 8/1978 | England et al. | 364/200 |
| 4,136,383 | 1/1979 | Takesue | 364/200 |
| 4,162,520 | 7/1979 | Cook et al. | 364/200 |
| 4,189,769 | 1/1980 | Cook et al. | 364/200 |

*Primary Examiner*—Eddie P. Chan
*Attorney, Agent, or Firm*—Alfred W. Kozak; Nathan Cass; Kevin R. Peterson

[57] ABSTRACT

A microprocessor system works in conjunction with an application dependent logic module tailored to serve the particular requirements of a given peripheral device. The microprocessor is provided with a linear microsequencer circuit to operate with all types of application dependent logic modules and to provide instructions and control for data transfer operations. Means are provided in the microprocessor for operation in a "normal" mode whereby a first set of accumulator registers and flag registers are used exclusively, and in a "background" or interrupt mode where a second set of accumulator registers and flag registers are used exclusively.

12 Claims, 24 Drawing Figures

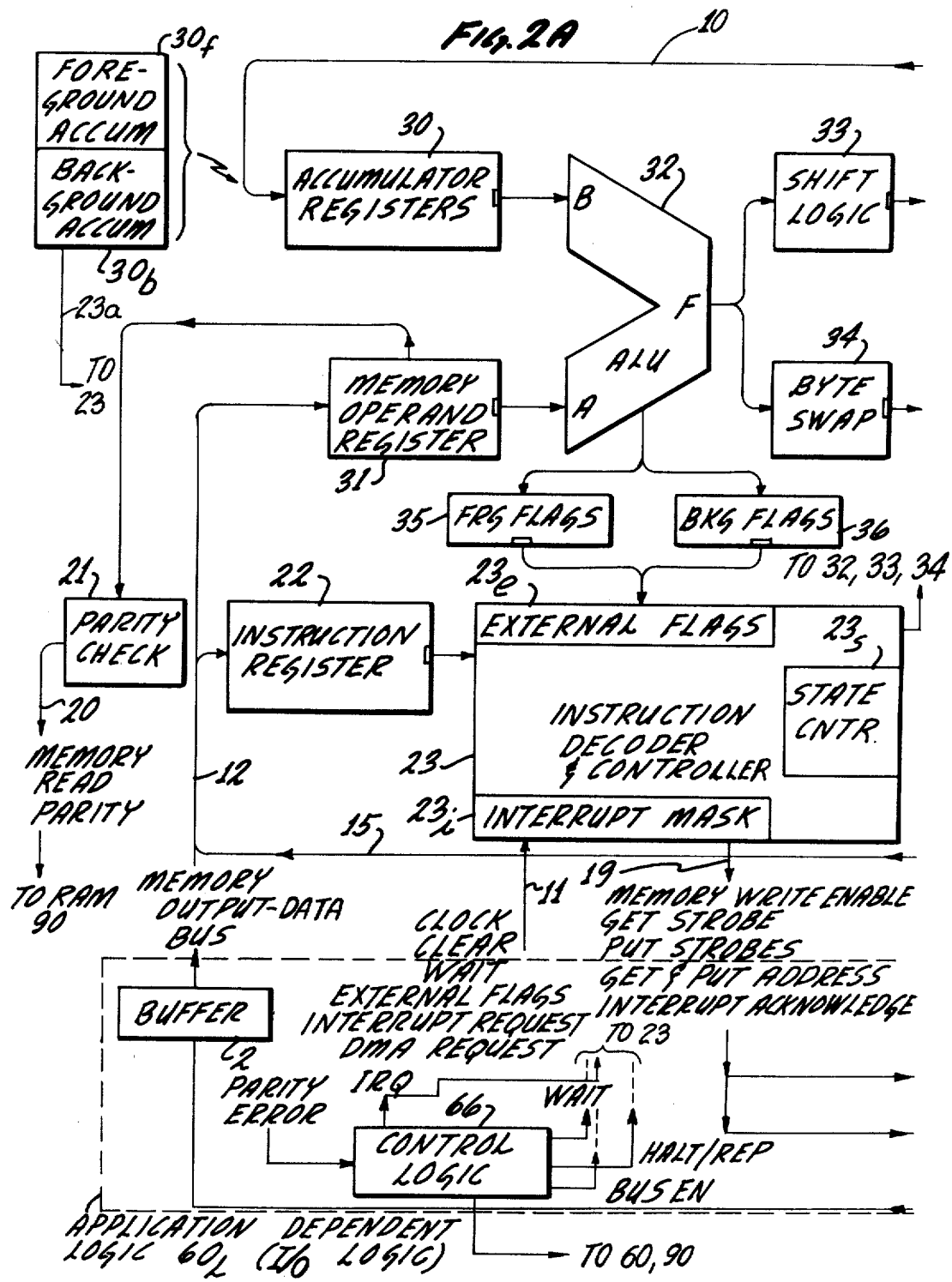

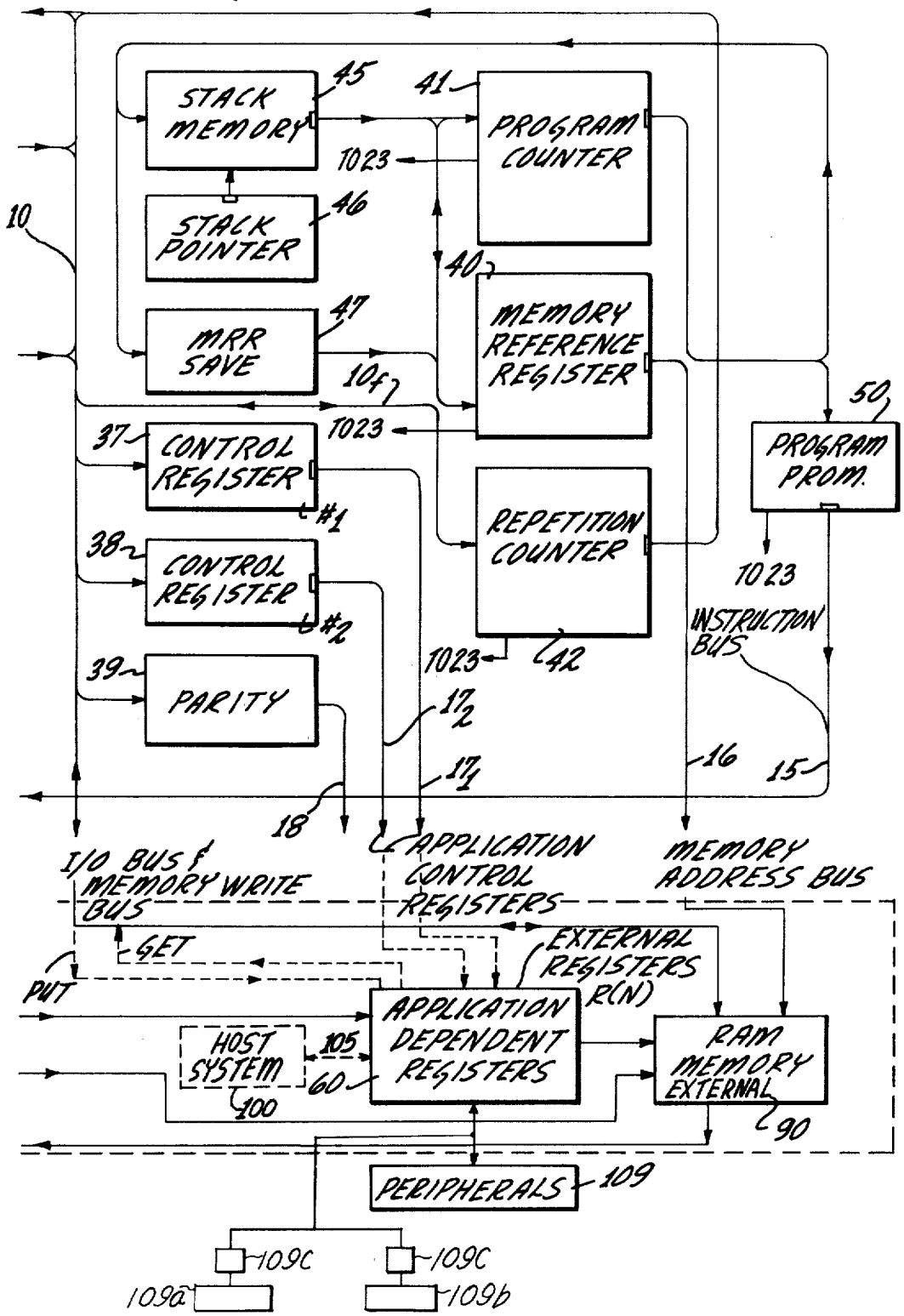

FIG. 2C DECODER CONTROLLER WITH LINEAR SEQUENCER

STATE COUNTS

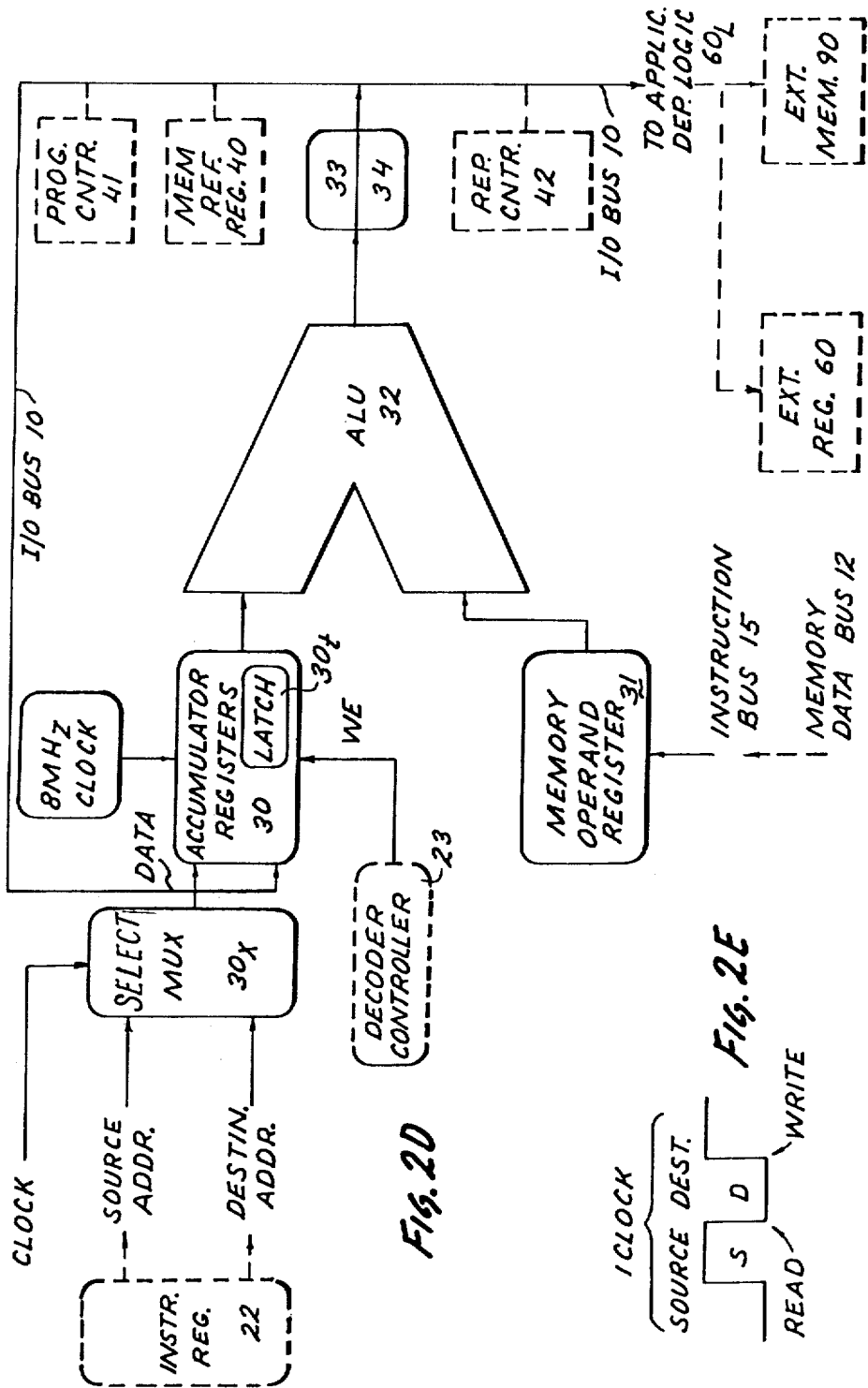

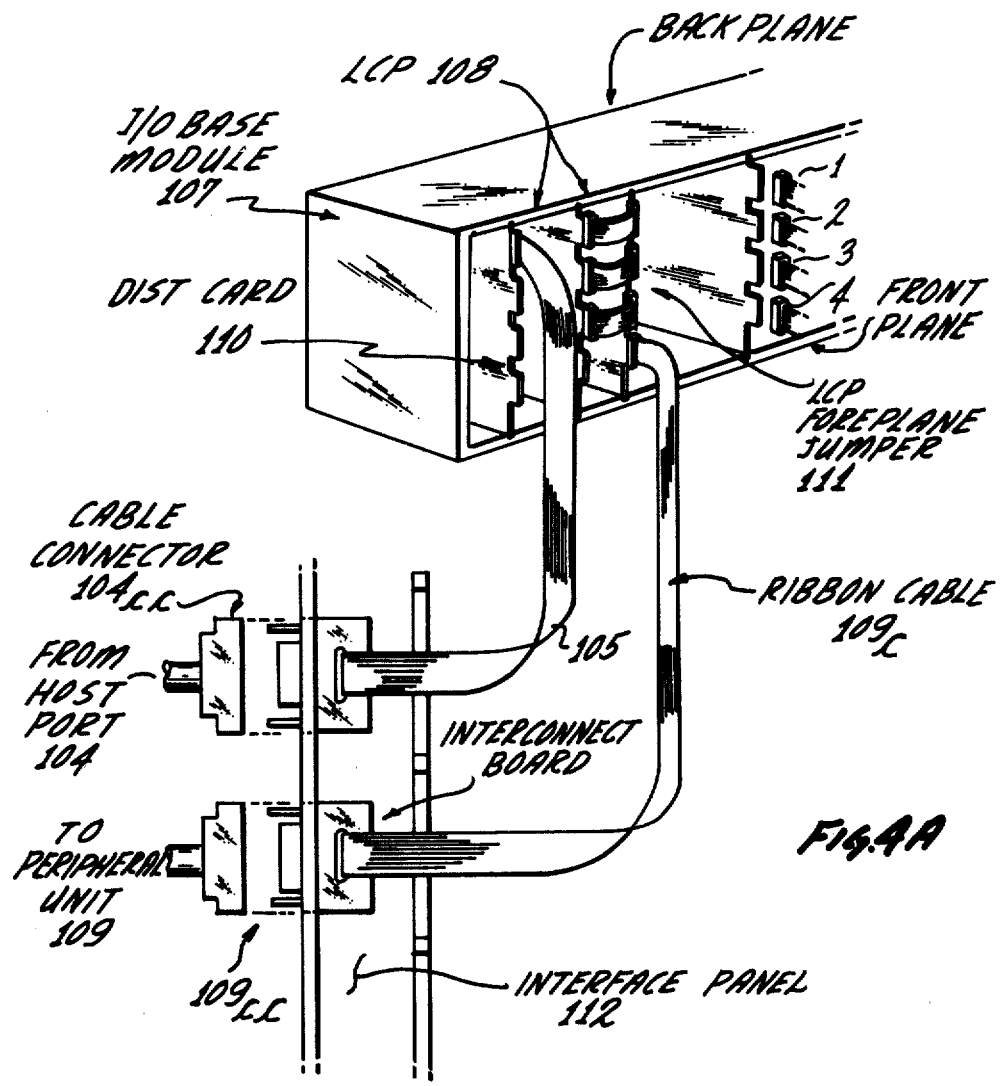

NOTE: SEE TABLES VII–XI FOR SIGNAL DESCRIPTIONS

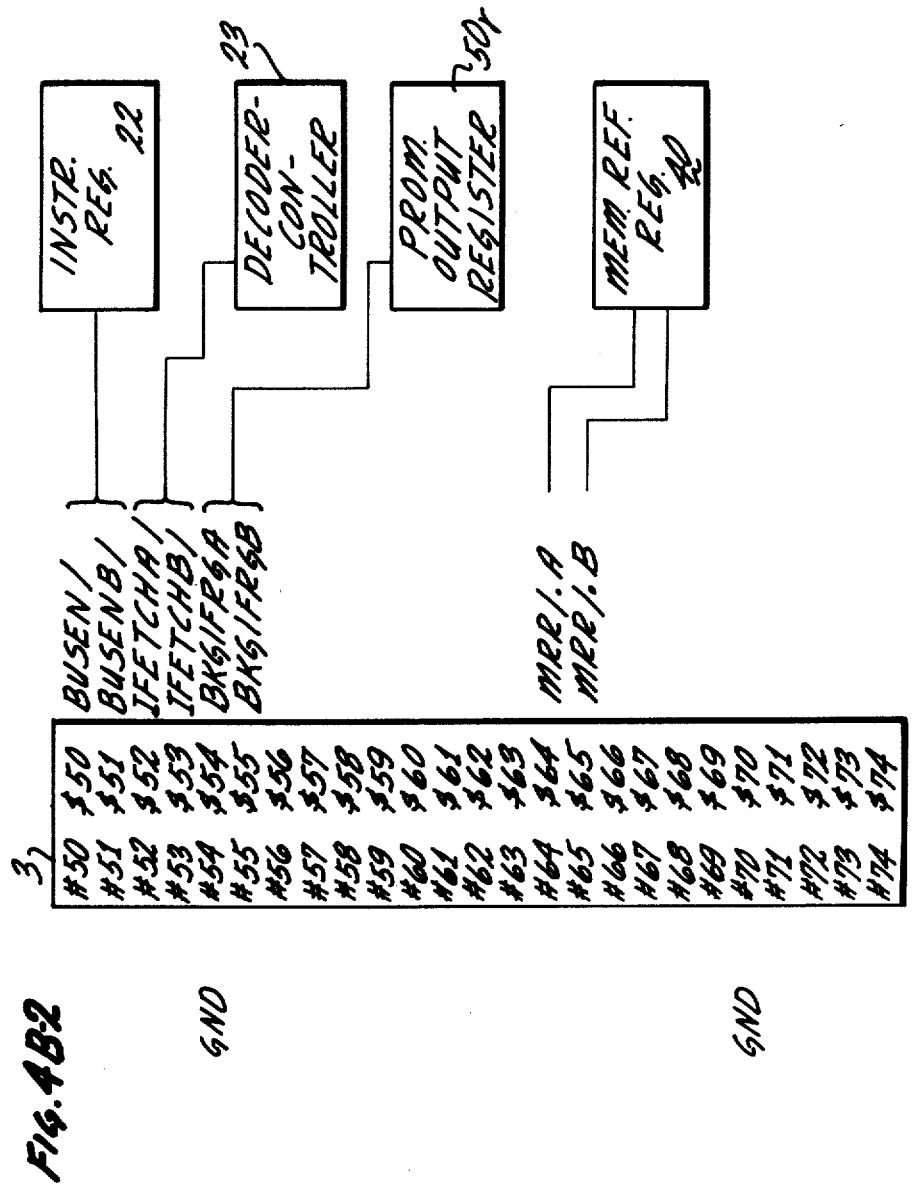

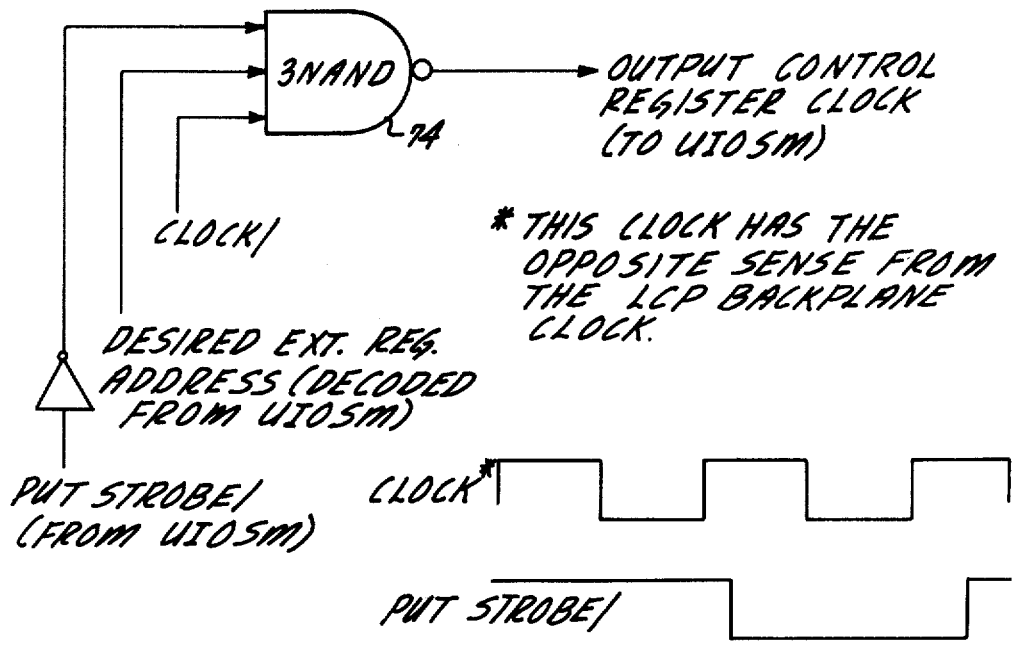
Fig. 5 CLOCKING OF OUTPUT CONTROL REGISTERS (37, 38)
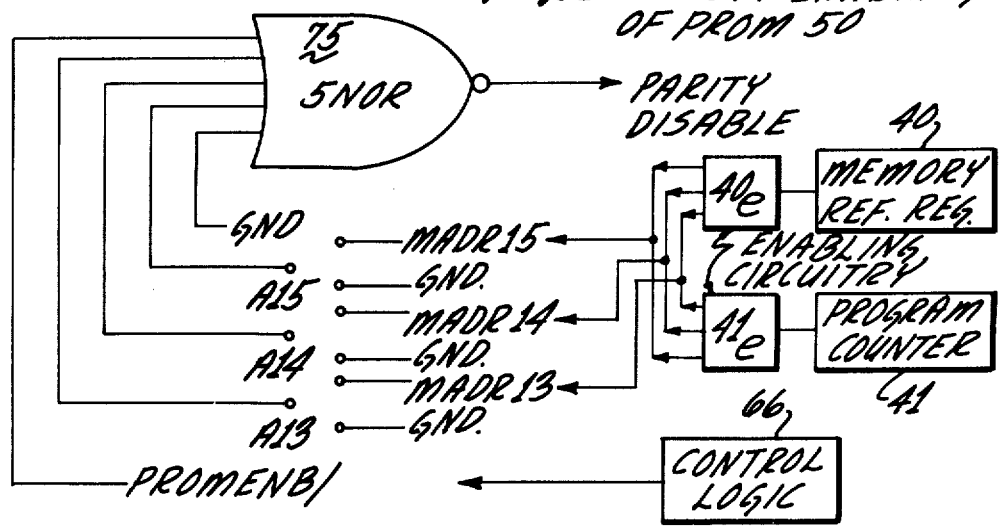
Fig. 6 UIO-SM ENABLING OF PROM 50

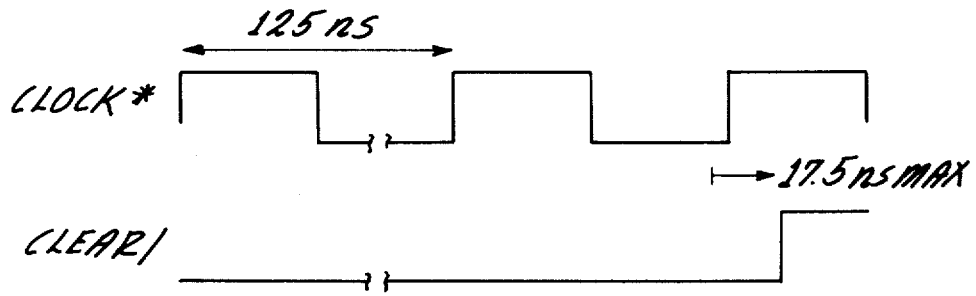
Fig. 7 CLEAR LINE TIMING
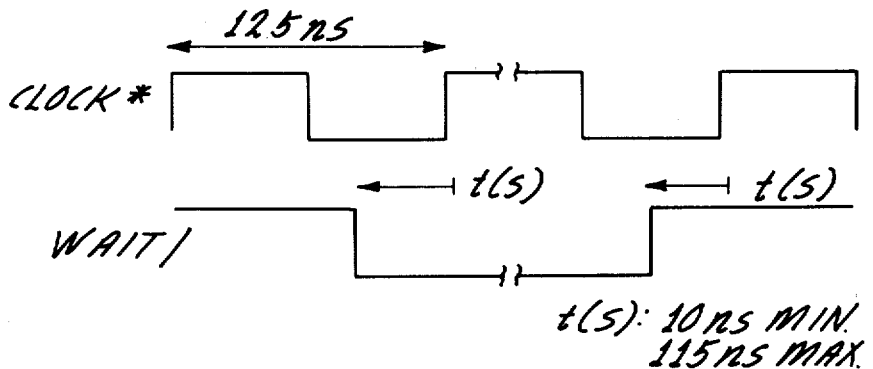
Fig. 8 WAIT LINE TIMING

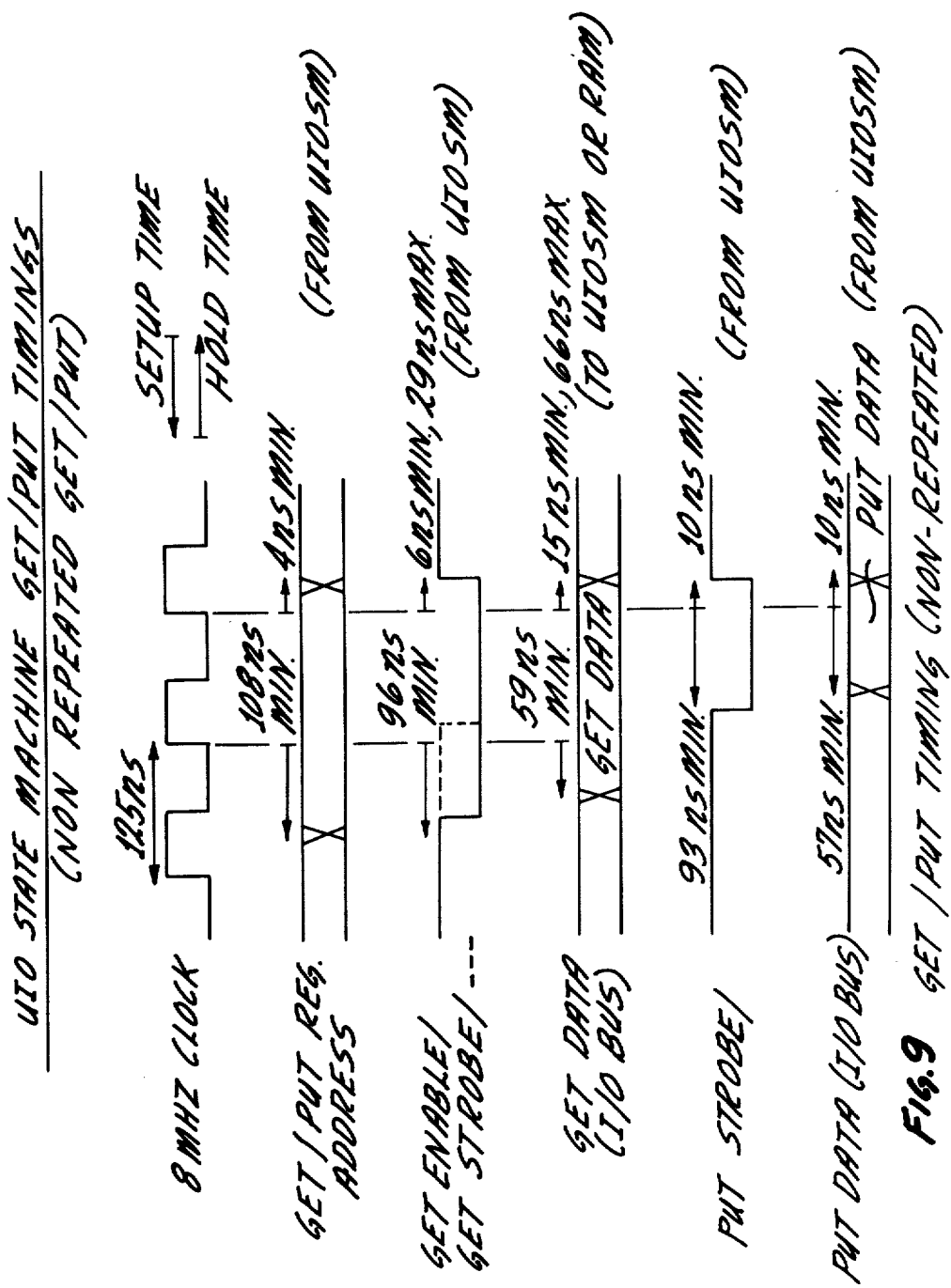

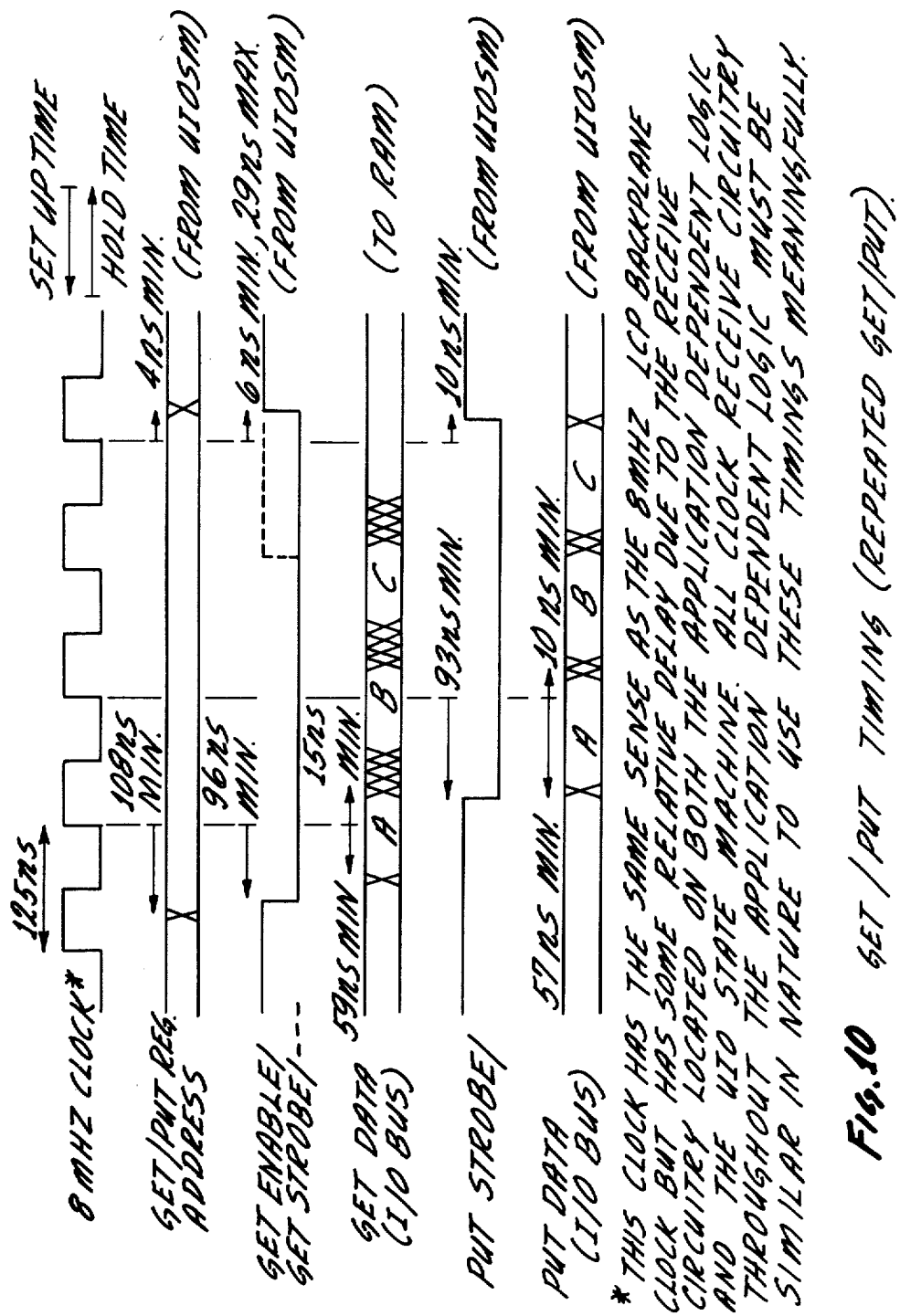
Fig. 10 GET/PUT TIMING (REPEATED GET/PUT).

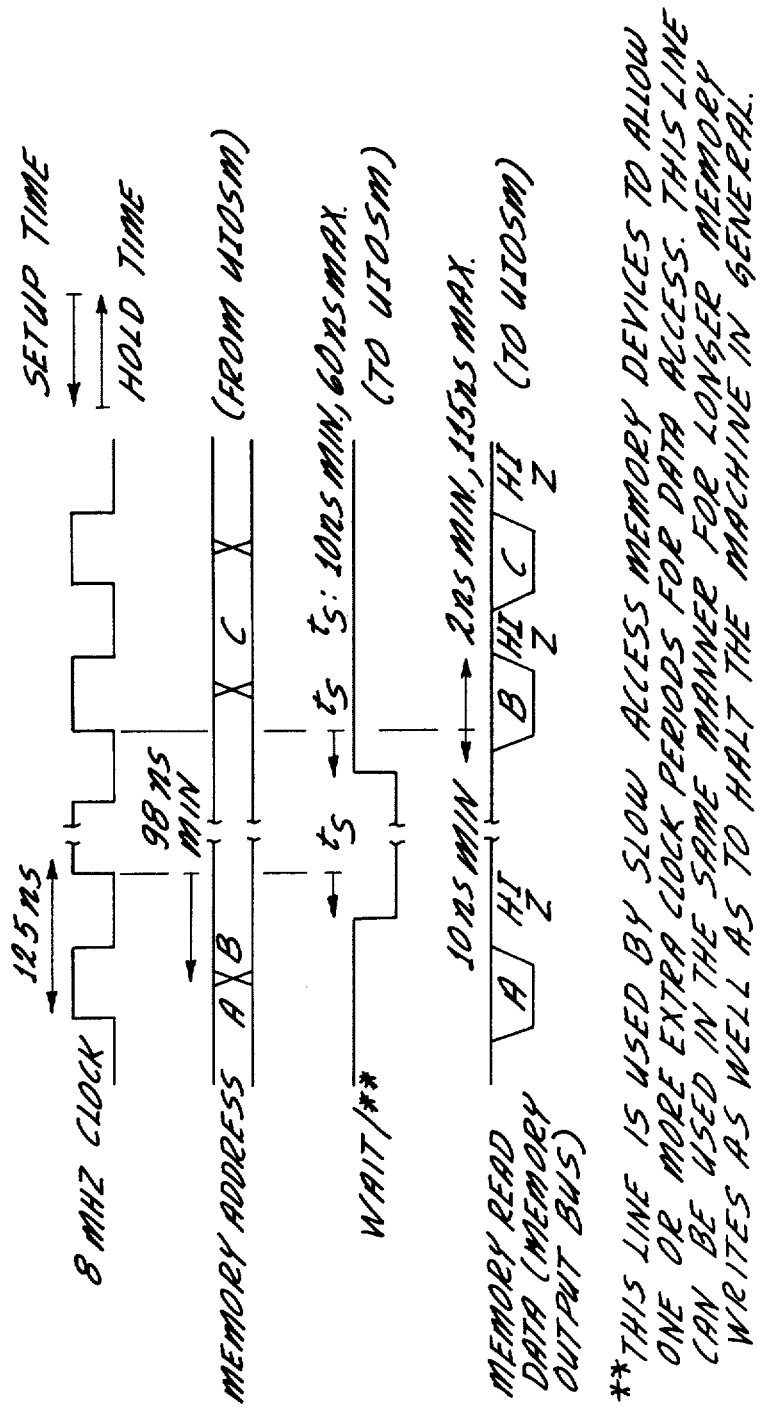
FIG.11 MEMORY TIMING (READ) FOR UIO-SM

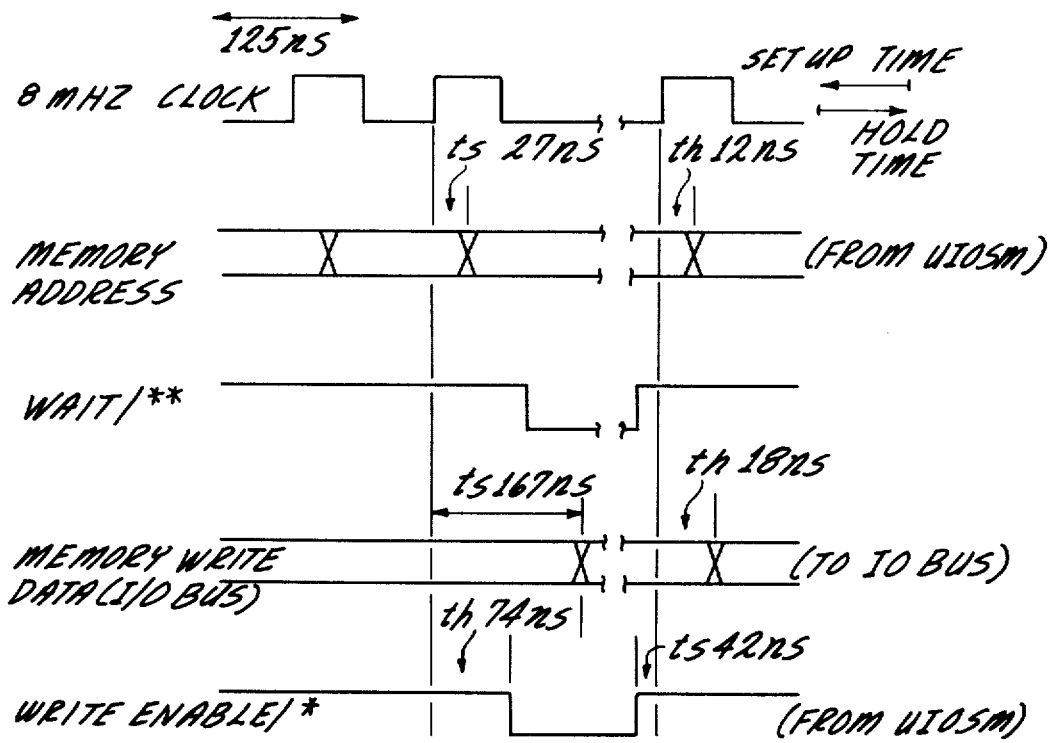

* THIS SIGNAL IS LOW FOR ONE CLOCK CYCLE (125ns) DURING GET INSTRUCTIONS AND TWO CLOCK CYCLES (250ns) DURING WRTW OR WRTB INSTRUCTIONS. THIS SIGNAL WILL NOT BE EXTENDED IF ADDITIONAL WAIT STATES ARE INJECTED. AN EXTERNALLY GENERATED RAMWE/ SIGNAL WILL BE REQUIRED FOR MEMORY DEVICES THAT USE ADDITIONAL WAIT STATES.

** THIS LINE IS USED FOR A LONGER MEMORY WRITE CYCLE FOR SLOW WRITE MEMORY DEVICES. THIS LINE CAN BE USED IN THE SAME MANNER FOR LONGER MEMORY READS AS WELL AS TO HALT THE MACHINE IN GENERAL.

FIG. 12 MEMORY TIMING (WRITE) FOR UIO-SM

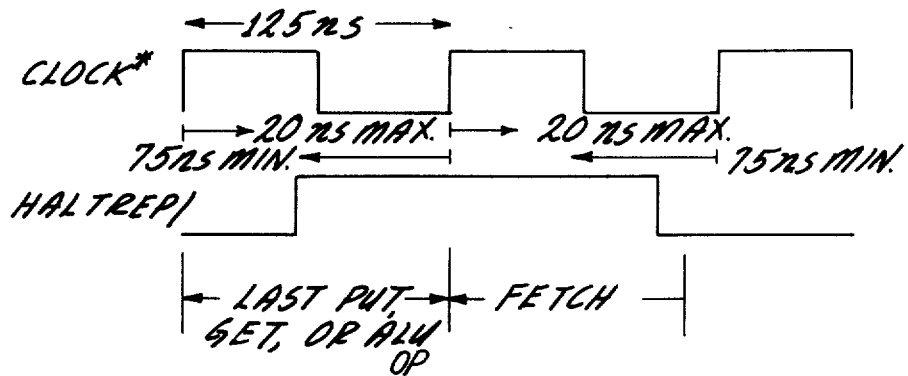
Fig. 13 HALT REPETITION TIMINGS
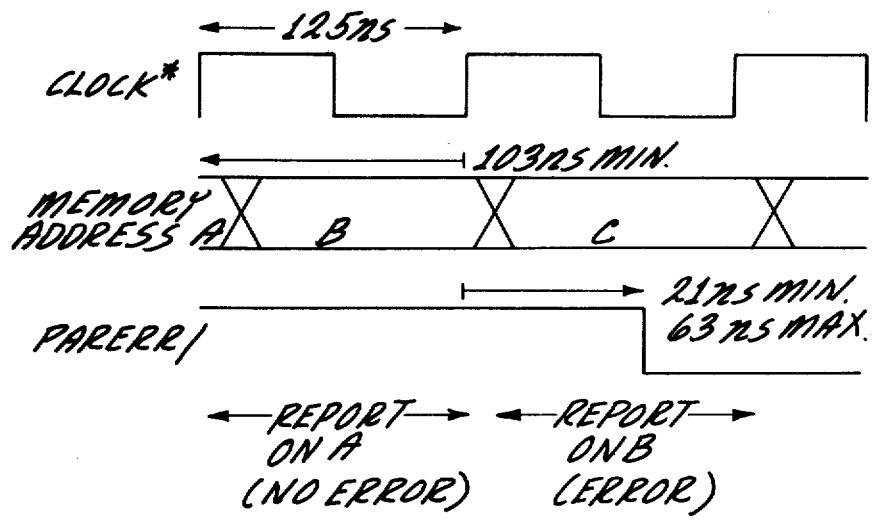
Fig. 14 PARITY ERROR REPORT TIMING

LINEAR MICROSEQUENCER UNIT COOPERATING WITH MICROPROCESSOR SYSTEM HAVING DUAL MODES

This application is a continuation-in-part of U.S. Ser. No. 052,479, filed June 27, 1979, and entitled "Dual Mode Microprocessor System", now U.S. Pat. No. 4,287,560, inventors Brian K. Forbes and Robert D. Catiller.

BACKGROUND

Field of the Invention

This invention relates to a microprocessor system that employs a program PROM for instruction storage, an arithmetic logic unit for processing data, associated registers and circuitry, working in conjunction with an external application dependent control logic module having external memory, registers and control logic for communicating to peripheral devices.

CROSS REFERENCES TO RELATED APPLICATIONS

This application is related to the following patent applications filed as follows:

A patent application entitled "Microprocessor System Facilitating Repetition of Instructions", inventors Robert Catiller and Brian Forbes, filed June 27, 1979, U.S. Ser. No. 052,687, now U.S. Pat. No. 4,292,667.

A patent application entitled "Microprocessor System with Source Address Selection", inventors Robert Catiller and Brian Forbes, filed June 27, 1979, U.S. Ser. No. 052,477, now U.S. Pat. No. 4,290,106.

A patent application entitled "Microprocessor Having Word and Byte Handling", inventors Robert Catiller and Brian Forbes, filed June 27, 1979, U.S. Ser. No. 052,478, now U.S. Pat. No. 4,301,505.

A patent application entitled "Digital System for Data Transfer Using Universal Input-Output Microprocessor", inventors Robert Catiller and Brian Forbes, filed June 27, 1979, U.S. Ser. No. 052,336, now U.S. Pat. No. 4,293,909.

A patent application entitled "Microprocessor System with Specialized Instruction Format", inventors Brian Forbes and Robert Catiller, filed June 27, 1979, U.S. Ser. No. 052,350, now U.S. Pat. No. 4,291,372.

PRIOR ART

Microprocessors and microprocessor systems will be seen to generally follow the architectural formulas and interrelationships which were established from general computer technology. However, microprocessors making use of large scale integrated techniques can be made into small packages with the use of integrated circuit chips and will generally follow the pattern of using a central processing unit, memory input-output circuits and various other control and support circuitry.

It is typical that the architecture of microprocessors will generally use a program counter which is used to select some portion of memory to be addressed for retrieving program instruction codes to be executed.

In the usage of a system where a central or main host processor operates in conjunction with a number of remotely located "base modules" which base modules support a group of peripheral-controllers which service and control external peripheral units, a considerable amount of circuitry has been required to provide data transfer capability on an efficient basis and also to cater to the specific needs of each type of peripheral unit.

Heretofore each peripheral-controller which was situated in a base module was burdened with many processor and control circuits for handling the specific requirements of each peripheral terminal unit leading to a heavy burden of circuitry in each peripheral-controller.

SUMMARY OF THE INVENTION

To alleviate the burden of costly circuitry for each peripheral controller, a universal or architecturally standard microprocessor was developed which would provide a multiplicity of processing functions for each peripheral-controller so that the peripheral-controller would only need a limited amount of application dependent logic and circuitry tailored to the particular peripheral which it serviced. Thus, the universal processor, or as it is called here the "universal I/O state machine", could serve as a standard unit for all types of peripheral-controllers so that each of the peripheral-controllers would only need to have the minimum amount of circuitry required for application to a particular peripheral.

Thus, with the use of the universal I/O state machine as a general purpose microprocessor in these applications, it became possible to reduce the cost, the quantity of circuitry, the space requirements and the system of architectural arrangements so that a more economical and more efficient architectural system could be established. Thus, with the advent of the described universal I/O state machine, there has been devised a generalized type of microprocessor which can serve with any type of peripheral-controller in a base module thus to handle any variety of peripheral terminal units. This generalized and simplified type of microprocessor (oriented to (a) addressing instructions and data and (b) manipulating data) executes its operations very rapidly and is designed to handle individual bytes for operations with peripheral devices which are "byte" oriented and also can execute processing and transfer operations with complete words (a word here being two 8-bit bytes symbolized as AB) for use with peripheral terminals which are "word oriented" and which can accept or transmit full words.

The universal microprocessor working in conjunction with the peripheral oriented application logic permits the development of a variety of peripheral-controllers whose advantage is in respect to the minimal amount of circuitry needed to adapt to the pecularities of any given peripheral device. Since the hardware and programming of the microprocessor remains standard and constant for each of the peripheral-controllers, it is thus possible to accomplish not only great versatility in data transfer and control features but also to provide great economies in circuitry and cost.

In digital systems where many instructions and control signals are required for the transfer of data to a variety of different types of peripheral units, generally a specifically tailored and designed peripheral-controller is provided which is particularly suited to handle the data transfers to and from a single particular type of peripheral unit. It was found that by providing a uniform microprocessor for all types of peripheral-controllers which only varied in the type of application dependent logic required for specific types of peripheral devices, that great economies of space and cost could be realized. Thus, the combination of a universal microprocessor working in conjunction with an application dependent module could serve the function of a peripheral-controller in an optimum fashion.

The microprocessor of the present system provides a processor or arithmetical logic unit, a program memory, memory address means which includes a program counter for addressing internal program memory, and a memory reference register for addressing external memory in said application dependent logic module. An instruction register receives instructions from said program memory (or external memory) on an instruction bus which is conveyed to an instruction decoder-controller. A plurality of addressable accumulator registers connects to an input-output bus and temporarily stores data for input to said arithmetic logic unit. A stack memory saves data from the program counter during interrupt actions while a memory-save register saves data from said memory reference register during interrupt operation. An instruction decoder-controller generates and receives control signals to and from said application dependent logic module, in addition to providing control signals to the universal microprocessor. While prior microprocessors used sequencing means requiring both a program counter and a next address field (which required a relatively large number of bits) the present microprocessor accomplishes sequencing using a state counter and a PROM (for holding microcode instruction words).

A Clear line is provided for establishing the microprocessor operation into the normal operating or "foreground" mode, while an interrupt request line, when signaling an interrupt request, will place the microprocessor operations into the interrupt or "background" mode. A dual set of accumulator registers and a dual set of flag registers is provided, in each case, one set for the foreground mode and one set for the background mode so that data used in the foreground mode will be preserved in the foreground registers during interrupts.

A linear microsequencer circuit operates a decoder-controller in the microprocessor. The microsequencer includes a micro-instruction PROM which is sequentially stepped by a State Counter after being initiated by the "Clear" signal. The micro-instruction PROM also receives signals from an instruction register and flag registers. The micro-instruction PROM then provides Control Term signals for operation of the microprocessor system.

BRIEF DESCRIPTION OF THE DRAWINGS

FIG. 2 is a diagram of the elements of the universal input-output microprocessor state machine and its communication lines to the application dependent logic module. FIG. 2 is subdivided into two portions designated as FIG. 2A and FIG. 2B such that by juxtaposing FIG. 2A to the left of FIG. 2B (and FIG. 2B to the right of FIG. 2A) the continuity of connections between the two drawings may be seen. FIG. 2C-1 shows the state counts; FIG. 2D illustrates the addressing of selected accumulator registers and their relation to the arithmetic logic unit and I/O bus; FIG. 2E shows how source and destination addresses are accessed in one clock period.

FIG. 4A is a perspective drawing of the input-output base module and showing major elements such as the distribution control card, the peripheral controller (line control processor) card and certain connections from the front plane (fore plane) to the host computer and to peripheral units. FIG. 4B is oriented such that it shows the first front plane connector while FIG. 4B-1 shows the second front plane connector. Orientation-wise the FIG. 4B-1 can be juxtaposed underneath the FIG. 4B in order to provide continuity to the connections shown between the two front plane connectors. FIG. 4B-2 illustrates connections to the front plane connector No. 3 and FIG. 4B-3 illustrates the connections to the front plane connector No. 4.

FIG. 5 is a timing diagram showing the clocking of output control registers of the UIO-state machine.

FIG. 6 is a circuit drawing showing how the program memory is enabled.

FIG. 7 is a timing diagram for the clear line.

FIG. 8 is a timing diagram showing the WAIT line timing.

FIG. 9 is a timing diagram showing timing for non-repeated GET/PUT functions.

FIG. 10 shows the timing diagrams for the repeated GET/PUT functions.

FIG. 11 is a diagram showing the correlated timing features for reading data from external memory on the memory data bus.

FIG. 12 is a timing diagram showing the timing correlations between the clock, the memory address signal and the memory write data on the I/O bus.

FIG. 13 is a timing diagram showing the relationship of the halt repetition function signal to the clock.

FIG. 14 is a timing diagram showing the relationship of the parity error signal to the clock and memory address signal.

DESCRIPTION OF THE PREFERRED EMBODIMENT

Figure 1:
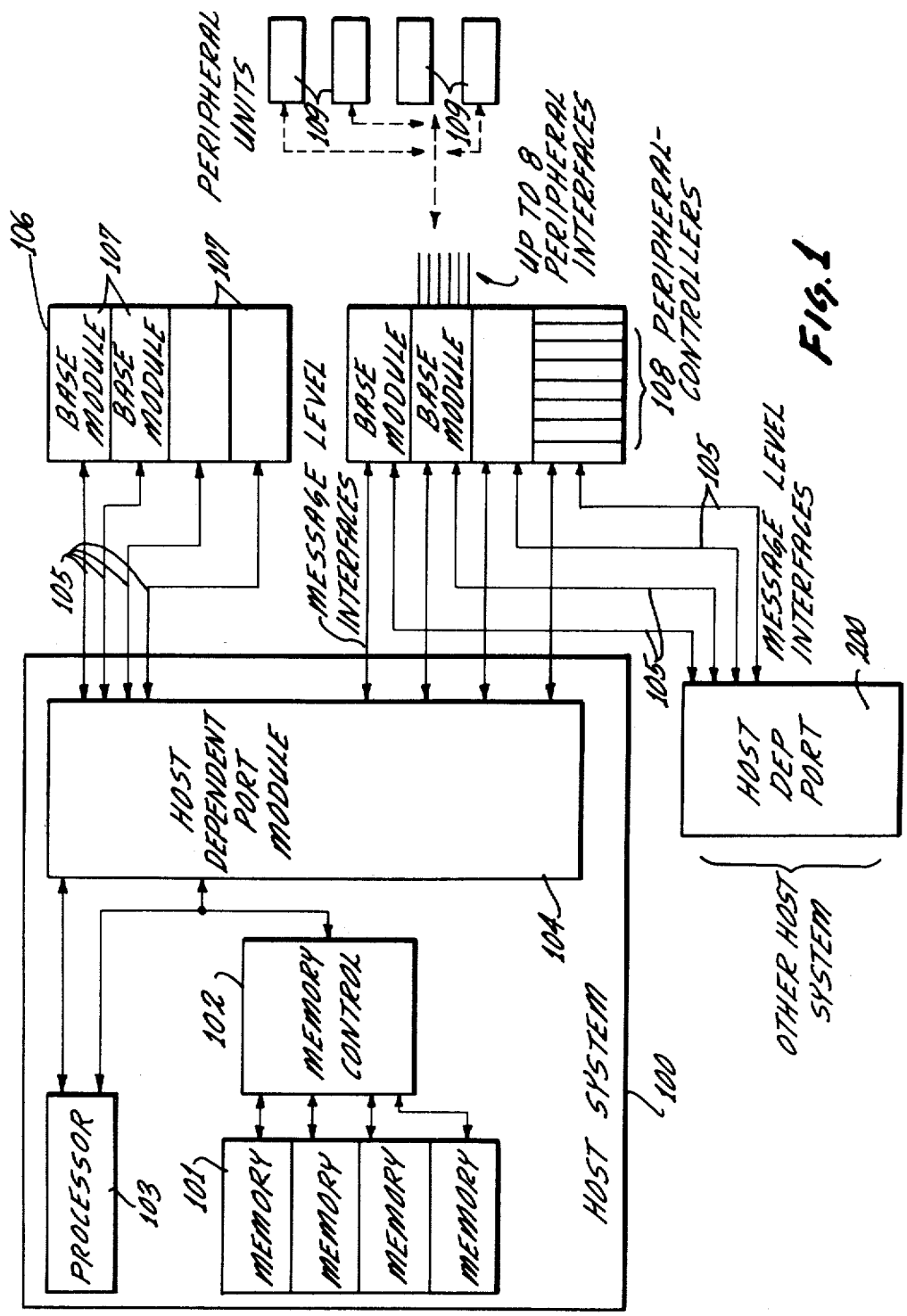
FIG. 1 is an overall block diagram illustrating the use of a main host system computer with a plurality of base modules which support peripheral-controllers which communicate with peripheral devices.

Referring to FIG. 1, there is seen a system block diagram of a typical Burroughs host computer system, with central processing unit cabinet 100 having basically a series of main memory modules 101, a memory control module 102, a data processor module 103, working in cooperation with a host dependent port module 104. The host dependent port module provides a series of communication cables 105 designated as MLI or message level interfaces. These message level interfaces provide communication lines to a base module cabinet 106 (or a plurality of such cabinets) which are designated as the Universal Input/Output Base Module Cabinet. The base module cabinet is built to support a plurality of universal input/output (UIO) base modules 107. Each of these UIO base modules provides communication, control, and data transfer lines to specific types of peripheral devices.

It should be noted that the host dependent port module can have message level interfaces to a plurality of UIO base module cabinets. And likewise, each UIO base module cabinet may have message level interface communication lines to other host systems 200 (main memory and processor) in addition to the first described host system of FIG. 1.

In the preferred embodiment of the system to be described herein, it will be seen that a base module cabinet can support from one to four UIO base modules. Each of the UIO base modules may contain up to eight peripheral-controllers 108 known as "line control processors" and each of the line control processors will be dedicated to data transfer and control with a particular type of peripheral device 109.

Another provision of the system will allow for a unit designated as a line expansion module (LEM) which can be inserted in the UIO base module so that a single message level interface can be extended to communicate with up to eight UIO base modules.

The host system as represented by the central processing unit cabinet 100 can communicate with up to 64 peripheral controllers (line control processors) for each message level interface (MLI), if the base module is provided with the unit known as an LEM or line expansion module.

As seen in FIG. 1, the host system 100 can have eight message level interfaces (MLI) and can thus communicate with up to 512 peripheral controllers (line control processors).

The peripheral controllers or line control processors (LCP) are controllers which are dedicated to data transfer and control between a peripheral terminal and the main host system or a plurality of host systems.

The peripheral controllers known as line control processors have been described, both in their system interrelationships and in their internal workings, in a number of previously filed patent applications and issued patents. These include the following United States Patents: U.S. Pat. No. 4,174,352 entitled "Modular Block Unit for I/O Subsystem", inventors Darwen J. Cook and Donald A. Millers, II; U.S. Pat. No. 4,106,092 entitled "Interface System Providing Interfaces to Central Processing Units and Modular Processor-Controllers for an Input-Output Subsystem", inventor Donald A. Millers, II; U.S. Pat. No. 4,162,520 entitled "Intelligent Input-Output Interface Control Unit for Input-Output Subsystem", inventors Darwen J. Cook and Donald A. Millers, II: and U.S. Pat. No. 4,189,769, entitled "I/O Subsystem for Digital Data Processing System", inventors Darwen J. Cook and Donald A. Millers, II, and these patents are included herein by reference.

The peripheral controllers known as line control processors (LCP's) may generally fall into types of categories. There is the 2-card LCP and the 3-card LCP.

The 2-Card LCP

This peripheral controller has a first card which is designated as the CFE or common front-end on which there are supplied a plurality of read-only memories (ROM's); hardware-wise these common front-end cards are of the same construction and nature except that in individual cases the ROMs are made to hold different programs which are suitable to the application at hand or the peripheral device with which it is used; thus, hardware-wise all the front-end cards will be found to be the same physically but only differ in the fact that different program material is inserted in the individual ROMs. The second card in the 2-card LCP is the PDC or peripheral dependent card. This card is uniquely built and adapted to suit the particular type of peripheral unit to which it communicates. It may be designated as an "application dependent logic module".

The 3-Card LCP

Here, again, the first card is the CFE or common front-end card which is physically the same except for different programming inside the ROM, this program being varied according to the application required. The second card is the CDC or common data card which is tailored to suit the requirements of different peripheral units; however, it may be the same for such a group of items as magnetic tape, punched card-tape, disk pack, and console controls. The third card of the b 3-card LCP is designated as the PDC or peripheral dependent card. This card is unique and is designed to handle one particular type of peripheral device.

In FIG. 4A there is seen a more detailed perspective drawing of a typical I/O base module 107. A plurality of these base modules are housed and serviced by a base module cabinet 126 of FIG. 1.

The base module 107 provides housing whereby printed circuit cards holding integrated circuitry may be inserted on sliding tracks in order to connect with the backplane connectors for automatic connection into the system. A peripheral controller (or line control processor) 108 may require, as previously described, two printed circuit or three printed circuit cards. The base module may support up to eight such peripheral controllers in its housing. Communications between the base module and the host system are controlled by distribution card 110. Other specialized handling printed circuit cards may be inserted, such as the previously mentioned line expansion module, common front-end card, common data card; or a second distribution control card, etc., can be inserted for connection into said base module 107.

The frontplane or foreplane permits jumper cable connections 111 (FIG. 4A) between printed circuit cards and also permits connection cables such as message level interface 105 to the host computer or ribbon cable 109$_c$ to permit connection from the base module to external devices such as peripheral device 109.

An interface panel 106 may be provided on the base module cabinet 120 to provide for cable connectors such as 104$_{cc}$, 109$_{cc}$ to facilitate disassembly and reconnection.

As was described in the previously mentioned patent references regarding line control processors, each base module unit is provided with a Distribution Control Card 110, FIG. 4A, which connects the message level interface from the main host system to a selectively addressed line control processor (peripheral controller) in that base module. Further, the base module has a common maintenance card and a common termination card which acts in common to service the entire group of up to eight line control processors in a base module.

The UIO base module may also support a line expansion module or LEM. This feature expands the usage of a UIO base module by adding another Distribution Control Card which permits connection of that base module to yet another main host system in addition to the one already connected to the first Distribution Control Card. Thus, communication from a main host system can be expanded to cover two or more UIO base modules and their attendant line control processors. Likewise, two or more host systems can be made to communicate to a UIO base module or a plurality of such base modules.

When it is desired to have one UIO base module connected to two main host computers, then a control card is used which is called the BCC or base control card. The base control card serves two basic functions; (a) to provide an interlock when multiple host computers try to access a base module, so that line control processors can thus be locked out from use by unauthorized host computers, and (b) to provide assorted features such as a base identification (ID) number and for maintenance control. The BCC is not mandatory when multiple hosts are connected to a base; however, it is useful. The base control card, however, can also be used when only a single host computer is connected to the UIO base module. Thus, the BCC is an independent and optional module, as is the line expansion module LEM.

Thus, in reference to FIG. 1, it should be stated that when a host computer is connected to a UIO base module, the base module must have at least one distribution card 110, FIG. 4A, for each host computer which is connected to it. Now, when a UIO base module is connected to a multiple number of host computers, then there is need for the base module to be provided with a unit known as the PSM or path selection module. The path selection module is the control unit which regulates the communication to and from the multiple number of distribution cards in the UIO base module.

In the development of line control processors, such as indicated in the prior cited patents and references, it was found that the amount of logic required for adaptability to any given type of peripheral unit or to a variety of peripheral units required that expensive and space consuming logic circuitry be developed which would take large quantities of hardware and space requirements or printed circuit cards such that sometimes four or five extra logic cards were needed in order to complete a particular line control processor. Soon the cost and space requirements of these developments became prohibitive and better means were required for handling the variety of functions required of a line control processor.

In this situation a microprocessor-controller was developed which could handle all the basic logic for any variety of peripheral terminal units and which could be built with a minimum amount of components and placed on a single printed circuit card. This device was designated as the universal input/output state machine or UIO-SM. Thus, the UIO state machine could be built typically on a 112 chip circuit board and be placed within the slide-in card rack which is supported by the LCP base module (now called UIO base module). The UIO state machine can interface easily to any application dependent logic through its front plane and, except for power connections and clock connections, no connections needed to be made to the LCP or UIO base backplane. The universal I/O state machine is basically implemented in transistor type logic (TTL).

GENERAL OVERVIEW OF THE UNIVERSAL I/O STATE MACHINE

The UIO-SM has been made to implement a useful group of general purpose generators which include:
Arithmetic OP's
Logical OP's
Read/Write Memory OP's
PUT/GET OP's
Program Stack OP's (Branch, Call and Return)

At FIG. 2 there is seen an overall block diagram of the UIO state machine. The input/output lines at the bottom of the drawing are all front plane lines which connect to the peripheral's application dependent control (PDC) logic since it is desired that the UIO state machine itself be independent of any application type logic or of the special requirements of particular peripheral units.

Referring to the state machine block diagram of FIG. 2, there will be seen a series of interconnecting lines 16, $17_1$, $17_2$, 18, 10, 19, 11, 12 and 20, which connect to the application dependent logic $60_L$. These lines are labeled, such as the external memory data output bus 12, the I/O and memory write parity line 18, the memory address bus 16, the memory write enable 19 (and other functions listed on FIG. 2), the direct memory access (DMA) request line 11 (and other functions on FIG. 2), in addition to the main I/O bus 10. Line 15 is the instruction output bus from the program PROM 50.

A program counter 41, having input lines from stack memory 45 and I/O bus 10, via $10_f$, provides an output line which feeds an input signal to the program PROM 50 (internal memory 50). A memory reference register 40 (MRR) receives its input signals via I/O bus 10 from accumulator registers 30, memory operand 31, and the save-MRR 47 (memory reference register-save). Repetition counter 42 also receives an input line via I/O bus 10 for signals from accumulator registers 30 and memory operand 31.

The stack memory 45, controlled by stack pointer 46, provides an output line to the program counter 41. The repetition counter 42 provides an output which feeds back around line $10_f$ over to the I/O bus 10 and also around to the accumulator registers 30.

Attached and receiving input from the I/O bus 10 is a control register 1 designated as item 37, a control register 2 designated as item 38 and a parity register 39. The control registers 37, 38 provide buffering of signals to application control register lines $17_1$, $17_2$. The parity generator 39 has an output line 18 (part of I/O bus 10) and provides "I/O and memory write" parity.

The memory output data bus 12 from RAM external memory 90 connects to the memory operand register 31 whose outputs feed to ALU 32 and parity check circuitry 21 which has an output line 20 to provide memory read parity to external memory 90. Data bus 12 also provides an input to the instruction register 22 which has an output line connecting to the input of the instruction decoder-controller 23. Situated within instruction decoder-controller 23 are external flag registers $23_e$, interrupt mask $23_i$, and state counter $23_s$.

Accumulator registers 30 actually comprise two sets of eight registers, one set designated $30_f$ (foreground accumulator registers) and the other set as $30_b$ (background). Each of the 16 registers are addressed and selected by an address line $23_a$ from the instruction decoder-controller 23.

The I/O bus 10 provides a channel to the accumulator registers 30 which have an output to the B input of the arithmetic logic unit 32. Another input A to the arithmetic logic unit 32 comes from the memory operand register 31 which gets its input from external memory via the memory output bus 12, or from internal memory via bus 15.

The arithmetic logic unit 32 (ALU) has one set of outputs which feed to the "foreground" flag register 35 and another set of outputs to the "background" flag register 36. These flag registers 35 and 36 form an output which is fed to the instruction decoder-controller 23. They are used to signal "foreground mode" conditions for normal operation and "background mode" conditions for interrupts or emergency operation.

The F output of the arithmetic logic unit 32 feeds on a bus $10_i$ to the shift logic circuitry 33 and to the byte-swap circuitry 34. The outputs of these circuits 33, 34 connect to the I/O bus 10.

SUMMARY: GENERAL OPERATION

The PUT OP (operator) writes a 16-bit word (two bytes symbolized as AB) from the I/O bus 10 into a selected application dependent register 60 (external register), the particular register being addressed via GET-PUT address lines 19. The PUT OP can address any one of 32 application dependent registers. The GET OP reads a 16-bit word from a selected application dependent register 60 into an accumulator register 30 on the UIO-SM or into RAM memory 90 through the I/O bus 10. The GET OP can also address a selected one of the 32 application dependent registers 60 (external registers).

The UIO-SM has the ability to repeat certain OP's (PUT's, GET's and logical OP's) by loading a number N (from the software) into a repetition counter 42 to control the memory reference register (MRR) 40 which is used as a counter after having been loaded with the starting address of the data block to be used in the "repeated" OP. A more detailed discussion of this operation is presented hereinafter in connection with FIG. 2F.

In order to hold "PUT Data" for a longer period of time than can occur directly off of I/O bus 10, there are two 8-bit registers (control registers 37, 38) which have been placed in the UIO-SM. The strobing of these registers 37, 38 is under the control of the application dependent logic $60_L$ (FIG. 2).

A "WAIT line" (on bus 11) has been built into the UIO-SM such that when an external "slow memory" is addressed, the "slow memory" can force the UIO-SM to wait however long required for the Read or the Write to be valid. This is seen on FIG. 2 at bus 11 which feeds signals to the instruction decoder-controller 23. This line can also be used to halt the machine. A clock enable line on bus 11 (CLKENB) has been included so that the application dependent logic $60_L$ may control the state machine clock for single pulse operations and also direct memory access (DMA) operations. The timing for this signal is the same as the WAIT signal on bus 11.

As seen in the state machine diagram of FIG. 2, the UIO-SM can check via circuitry 21 for odd parity on each memory fetch. All memory fetches from external memory 90 come on the memory output data bus which is shown as bus 12 and which connects to instruction register 22 and to the memory operand register 31. All memory writes go out on the I/O bus 10 along with odd parity on line 18. The UIO-SM contains 8-K words of user-defined instruction programs in PROM 50 which is capable of being expanded to 64-K words.

Figure 3:
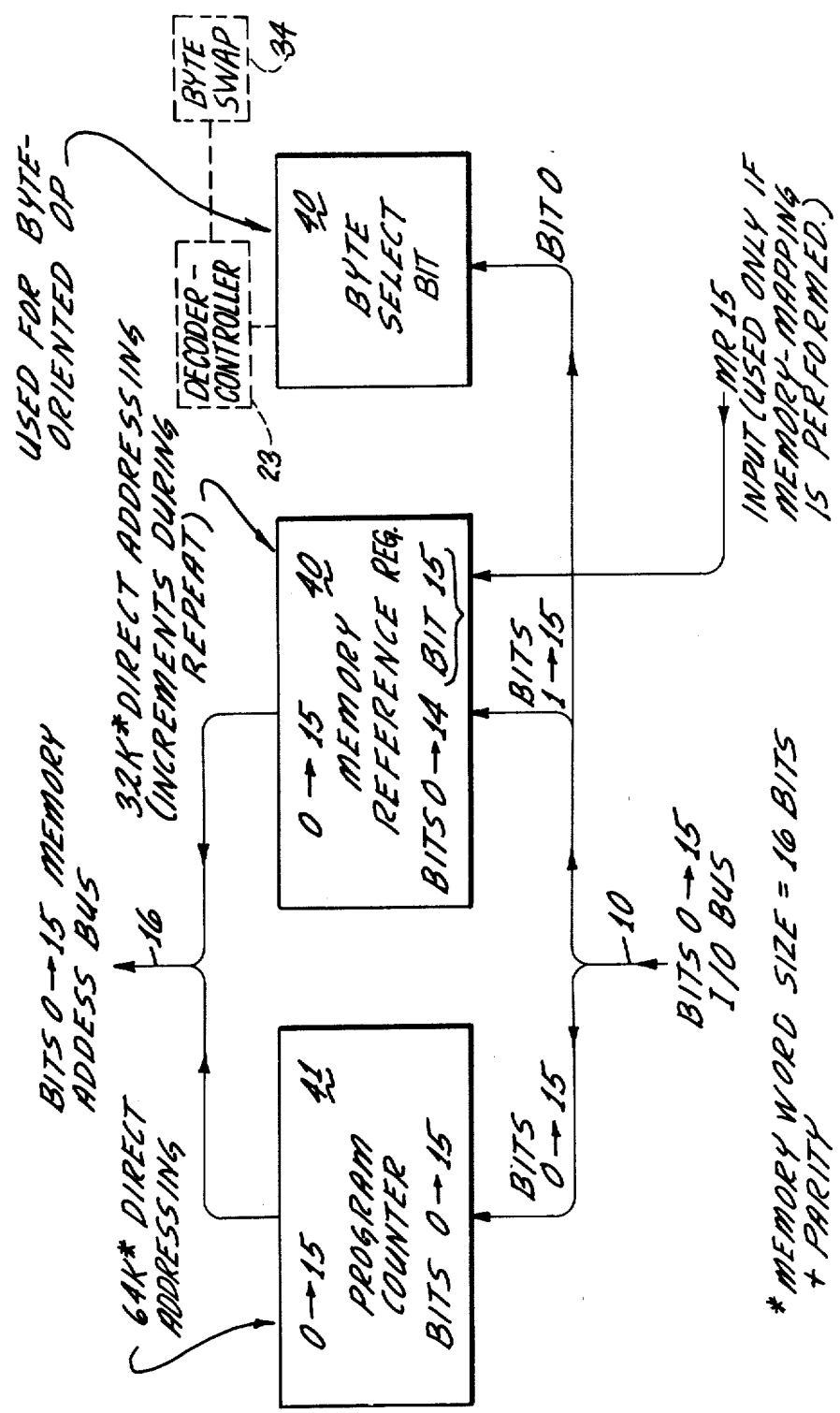
FIG. 3 is a schematic diagram showing certain memory addressing features of the UIO-State Machine, particularly the use of a dedicated bit designated as the "byte-swap" bit.

With reference to FIG. 3, it will be seen that memory addresses can come from two sources—the program counter 41 and the memory reference register (MRR) 40. The UIO-SM provides the ability to do condition and unconditional Branches, Calls and Returns. "Calls" can be nested up to 16 levels from stack memory 45. The memory reference register 40 stores addresses and is used (at certain times specified in instruction words) to address RAM data memory 90 which will provide programs applicable to the peripheral device connecting to the application dependent logic module $60_L$. This external memory 90 also serves to store data which is being transferred between the host computer and the peripheral terminal device. Since memory 90 and 50 are organized two bytes wide (16-bits plus parity) but the data for transfer is sometimes required in single byte form, as for peripherals such as card readers, the memory reference register (MRR) 40 has been designed such that only the high order 15-bits are used to address memory 90. The low order bit (BYTESWP) is used by the byte-oriented read/write OP's to determine whether or not to byte-swap the two byte data word before storage into accumulator registers 30 on an "external data memory read" or before storage into external RAM data memory 90 on a "data memory write". This particular feature permits the UIO-SM to easily handle byte-oriented data in that the desired byte is automatically read into the "low order" byte position of the accumulator registers 30 on "data memory reads", as well as being automatically written from the "low order" byte position into the correct byte position on "data memory writes". The "high order" byte position of the accumulator registers 30 must contain the last byte written, if any is present.

In Table I there is shown the instruction format for the UIO-state machine operators. The external memory output data bus 12, or internal memory instruction bus 15, provides 17 bits designated 0-16. The bus bits 0-7 (low order) constitute the "B" byte while the bus bits 8-15 constitute the "A" byte (high order).

TABLE I

INSTRUCTION FORMAT FOR UIO-STATE MACHINE OPERATORS

| Field | Field Specifier | Bus Bit on Instruction Bus 15 and Memory Data Bus 12 |
|---|---|---|
| Odd Parity | P | 16 |
| Basic Function | F1 | 15 |
|  | F0 | 14 |
| Function Variant | V4 | 13 |
|  | V3 | 12 |
|  | V2 | 11 |
|  | V1 | 10 |
|  | V0 | 9 |
| Destination Specifier (or Misc. Control) | D3 | 8 |
|  | D2 | 7 |
|  | D1 | 6 |
|  | D0 | 5 |
| Source Accumulator | S2 | 4 |
|  | S1 | 3 |
|  | S0 | 2 |
| Memory Address Source For Operand of Instruction | M | 1 |
| Copy ALU Output to Memory Reference Register | C | 0 |

Bus Bit 15-8 = "A" Byte
Bus Bit 7-0 = "B" Byte

F Field   V Field   D Field   S Field

| P | F1 | F0 | V4 | V3 | V2 | V1 | V0 | D3 | D2 | D1 | D0 | S2 | S1 | S0 | M | C |
| 16 | 15 | 14 | 13 | 12 | 11 | 10 | 9 | 8 | 7 | 6 | 5 | 4 | 3 | 2 | 1 | 0 |

A Byte       B Byte

As will be seen from Table I certain fields are specified such as the P field for odd parity, the basic function field F1, F0, and function variant field by V4–V0. The destination specifier field is designated D3–D0; the source accumulator field is designated S2, S1, S0. The field which causes selection of the memory address source to be used in fetching the operand of the instruction is designated M; while the function field for copying the arithmetic logic unit output into the memory reference register 40 is designated by the field C.

The odd parity bit is set such that an odd number of 1's will exist across the entire 17-bit instruction (or the operand). The basic function field F1, F0 is described in Table II such that various binary digit combinations of F1, F0 provide certain functions as shown.

TABLE II

| | | BASIC FUNCTION |
|---|---|---|
| F1 | F0 | Function |
| 0 | 0 | Contents of External Register to Accumulator or External RAM Memory (GET) |
| 0 | 1 | Contents of Accumulator or External RAM Memory to External Register (PUT) |
| 1 | 0 | ALU Operators |
| 1 | 1 | Program Stack Operators (Branch, Call, Return) |

For example, the GET function provides for the transfer of the contents of an external register 60 to the accumulator 30 or to RAM memory 90. The digital bits 0, 1 provide for the transfer of the contents of an addressed register in accumulator 30 (or an addressed portion of external RAM memory 90) to the external registers 60. This is called the PUT function. The F field bits 1, 0 provide for execution of the arithmetic logic unit operators; while bits 1, 1 provide for the functions of the program stack (45) operators such as Branch, Call, Return.

Table III shows the function variant field V4–V0 and its relation to the function field F1, F0.

TABLE III

| | | | | | | FUNCTION VARIANT |
|---|---|---|---|---|---|---|
| F1 | F0 | V4 | V3 | V2 | V1 | V0 Field Description |
| 0 | 0 | [ | | R(N) | | ] External Register Address (GET) |
| 0 | 1 | [ | | R(N) | | ] External Register (PUT) |
| 1 | 0 | [ | | ALU OP | | ] ALU Op Code |
| 1 | 1 | [ | | (OP) | | (TEST) ] Program Stack Op Code and Condition Test Specifier Conditions from Flag Register) |

TABLE III-continued

| | | | | | | FUNCTION VARIANT |
|---|---|---|---|---|---|---|
| F1 | F0 | V4 | V3 | V2 | V1 | V0 Field Description |
| | | | | | | (ICall & IRet are Unconditional Operators) |
| | | | | | | OP = 00 IRet |
| | | | | | | OP = 01 Call |
| | | | | | | OP = 10 Branch |
| | | | | | | OP = 11 Return or ICall |
| | | | | | | Test = 000 Unconditional |
| | | | | | | Test = 001 ALU = 0 |
| | | | | | | Test = 010 ALU MSB = 0 |
| | | | | | | Test = 011 ALU Carry = 1 |
| | | | | | | Test = 100 ALU LSB = 0 |
| | | | | | | Test = 101 External Flag 1 = 1 |
| | | | | | | Test = 110 External Flag 2 = 1 |
| | | | | | | Test = 111 External Flag 3 = 1 |

Note: The Program Stack OP's can Execute on Condition Test True or Not True depending on the Destination Specifier. IRet and ICall execute Unconditionally.

For example, the F-bits 0, 0 specify a GET operation from an external register address while the F-bits 0, 1 specify a PUT operation into an external register of a specified address.

Table IV shows the destination specifier field, D3, D2, D1, D0.

TABLE IV

| | | | | DESTINATION SPECIFIER (OR MISC. CONTROL) | |
|---|---|---|---|---|---|
| D3 | D2 | D1 | D0 | Destination (Or Misc. Control) | |
| | | | | (i) | GET and ALU OP's |
| 0 | 0 | 0 | 1 | Null, No Destination - Used to Update Flag Register only (ALU Op's Only) | |
| O | X | X | O | Write RAM Memory (GET and ALU Op's) | |
| 1 | | [ A(D) ] | | Destination Accumulator A(D) (GET and ALU Op's) can be same as Source Accumulator A(S) | |
| | | | | (ii) | PUT and Program Stack Op's |
| S | X | F | F | S = 0 | Operand Source from Memory (PUT and Program Stack Op's Accumulator A(S) (PUT and Program Stack Op's) |
| | | | | FF = 00 | Application Dependent Strobe No. 1 (PUT Op) |
| | | | | FF = 01 | Application Dependent Strobe No. 2 (PUT Op) Execute on Condition Test True (Program Stack Op) |
| | | | | FF = 10 | Application Dependent Strobe No. 3 (PUT Op) Execute on Condition Test Not True (Program Stack Op) |
| | | | | FF = 11 | Load Repetition Count Register (Repeat Register 42) (PUT Op) |

This D3–D0 field is subdivided into (i) GET and ALU OP's and (ii) PUT and program stack OP's. In the case of (i) there may be no destination specified; or only a miscellaneous control field may be used to update the flag register; or the destination may be the RAM memory 90.

In the case (ii) for the destination field, the operand source may come from RAM memory 90; or the operand source may be from the source accumulator 30; or the destination may be a load into the repetition counter 42.

The Source Accumulator Field S2, S1, S0 is shown in Table V below:

TABLE V

| SOURCE ACCUMULATOR A(S) FIELD |
|---|
| S2, S1, S0 |
| (i) ALU or PUT |
| [ A(S) ]    Operand from Source Accumulator A(S) [can be sam as Destination Accumulator A(D)] |

TABLE V-continued

SOURCE ACCUMULATOR A(S) FIELD
S2, S1, S0

(ii) GET
  S = XX0   Application 60 is Source
  S = XX1   Repetition Counter 42 is Source
(iii) Program Stack OP's
  V = 11CCC & S = XX0   Return Operator
  V = 11XXX & S = XX1   ICall Operator (Forced by Interrupt Hardware)

The source accumulator field specified as S2, S1, S0 (Table V) may apply (i) to the ALU or the PUT Op where the operand from the source accumulator A(S) can be the same as the destination accumulator A(D); or (ii) where the GET Op can function so that the source is an external application register 60 or that the source is the repetition counter 42; or wherein (iii) the program stack Op's can provide a return operator or an ICall operator.

M FIELD SPECIFIER: SELECTING MEMORY ADDRESS SOURCE FOR THE OPERAND OF AN INSTRUCTION

The M field specifier (as originally noted in Table I) may occur as one of two binary states, that is as a 0 or as a 1. When M is 0, then the operand for this instruction is located one address beyond this instruction (PC+1, program counter plus 1) or there is no operand. If the instruction does not require a memory operand, then PC+1 is not used for an operand; the next "instruction" will be at PC+1 (no space is allowed for an operand). The operators that do not use an operand are listed as follows:

1. All "GET" operators;
2. "PUT" operators with D3=1;
3. "CALL" or "BRANCH" with D3=1;
4. ICALL, RETURN, IRETURN, ROTR, SHFL, SHFR, CMA, ONES, ZERO, SWAC, WRTW, WRTB, DRTL, EI, DI and RSTK Operators. (These operators are discussed subsequently hereinafter).

When the M field bit is "1", then the operand for this instruction is addressed by the memory reference register 40 (MRR) or else there is no memory operand for this instruction.

C FIELD: FOR COPYING ALU OUTPUT TO THE MEMORY REFERENCE REGISTER 40

The C field originally shown in Table I may read as a 1 bit or a 0 bit. In the 1 bit situation this means that the machine will not copy the ALU output to the memory reference register 40; however, if the bit is "0", then the ALU output will be copied on to the memory reference regsiter 40. The C bit can be set to 0 on all instructions except GET's and RDB, RDBW, RBWR, SWAC and WRTB. These operators are discussed subsequently hereinafter.

FLAG REGISTERS

Two flag registers are provided so that at least one flag register is fully available for each of the two operating modes. Thus, flag register 35 is the "foreground mode" flag used under normal operating conditions while register 36 is the "background mode" flag which is used during interrupt or other unusual conditions. As seen in FIG. 2, flag registers 35, 36 receive output from the arithmetic logic unit 32 and provide an output line to feed input to the instruction decoder-controller 23. The flag register is updated at the end of all ALU operators (which include arithmetic OP's, logical OP's and load/store/move OP's). On OP's which "byte swap" the ALU 32 output before storage into the destination location, the flag register is updated on the basis of the full two bytes of information from the ALU 32 after being swapped. In the specific cases of REBW OP (read before write byte) and the RBWR OP (read before write byte reversed), a full memory word is read into the UIO state machine, but only one of the two bytes read is written into accumulator register 30 (the low order byte of the accumulator destination register remains unchanged). The flag registers (35,36) are updated on the basis of the full word read from RAM memory 90.

As indicated in FIG. 2, the accumulator registers 30 actually constitute two different sets of eight registers. One set $30_f$ of accumulator registers is for normal operating conditions (foreground mode) while the other set $30_b$ of eight accumulator registers is for abnormal conditions (background mode) as during interrupts.

INSTRUCTION REPETITION

The use of the repetition counter 42 provides an instruction repetition feature where a PUT or a GET OP may be repeated up to 256 times by the use of a PUT OP to load the repetition counter 42 which must be followed by the PUT or the GET OP to be repeated. Any value N from 0 to 255 (from the software) may be loaded into the repetition counter 42 and N+1 operations will be performed (1 to 256). The address source for the repeated PUT data or the address destination for the repeated GET data is found in MRR 40 and thus these addresses will originate from the memory reference register 40 and not from the program counter 41 (PC+1). In other words, the M-bit is set to "1" in the repeated PUT or GET. After each PUT or get OPs, the hardware will increment the MRR 40 in preparation for the next PUT or GET. When repeated, each individual PUT or GET will execute in one clock period, unless the PUT or the GET addresses a "slow memory", in which case there will be one extra clock period at the beginning of the repeated PUT's or at the end of the repeated GET's.

The use of the repeated PUT's or GET's serves to greatly increase code compaction while also greatly increasing the speed of the clock transfers to or from RAM memory 90.

Any logical OP (AND, CMA, CMM, OR,XOR, ONES, ZERO, ADDC, SUBC, etc. as described hereinafter) may be repeated up to 256 times by the use of a PUT OP to load the repetition counter 42 which must be followed by the logical OP to be repeated. Any value of N from 0 to 255 may be loaded into the repetition counter 42 and N+1 operations will be performed (1 to 256). For the repeated OP to work as expected, the source accumulator 30 should be equal to the destination accumulator 30. The address source for the operand data should originate from the memory reference register 40 (MRR) just as for the repeated PUT or GET. After each OP of the repeat sequence is executed, the hardware will increment MRR 40 in preparation for the next OP. When repeated, each individual logical OP will execute in one clock period, unless the operands are located in a "slow memory".

One particular case, where a repeated logical OP can increase code compaction and execution speed, is the use of the repeated "Exclusive OR" for the purpose of generating longitudinal parity on a data block located in external memory 90.

The PUT OP which loads the repetition counter 42 must have the N value in the "B" byte (low order 8-bits) of the PUT data. The "A" byte (high order 8-bits) is a "don't care".

The application dependent logic 60$_L$ has the capability of stopping instruction repetition even though the full number of operations has not occurred, as will be later discussed in connection with FIG. 2F.

The capability exists to do repeat operations with PC (program counter 41) used for the memory operand source address (M-bit equal to 0). In this case, PC 41 will increment during the repeat operation instead of MRR 40 (provided that the operator does use a memory operand). Using PC 41 during the repeated operations will allow the use of a multiple word literal following the single repeated operator. The size of the "literal" field must be exactly the number of words specified by the repeat count value plus 1 word. The HLT REP/ interface line (halt repetition) must remain "high" during all repeat operations using PC 41 as an address source for operand data.

In regard to the instruction execution speed, the basic clock rate for the UIO-SM is 8 MHZ (125 nanosecond clock period). All OP's, with the exception of the program stack operators, execute in two clock periods except such OP's that write from the UIO-SM accumulators 30 into RAM memory 90 (3 clocks required) or have operands to be fetched from or stored into "slow memory" (three or more clocks required). The program stack operators require 3 clock periods to execute if the condition is true (Branch or Call "executed") and only require 2 clock periods if the condition is false (Branch or Call "not executed"). The NO-OP executes in 2 clock periods. The OP IReturn executes in 3 clock periods, while Load and Store Accumulator executes in 4 clock periods.

The execution of any given instruction requires an "instruction fetch" along with the above-noted execution cycles; however, in the case of the UIO-SM, the instruction fetch for the next instruction is performed during the last execute cycle of the current instruction. Therefore, the "instruction fetch" is masked from the timing.

THE NO-OP

The NO-OP consists of any program stack operator (such as Branch) with the condition test field set to "UNCONDITIONAL" and the destination specifier set to "EXECUTE ON CONDITION TEST NOT TRUE" (Branch never). Whether or not the NO-OP occupies one or occupies two memory locations, is a function of whether or not the operand (Branch never address) is located next to the instruction (PC+1) or is addressed by the memory reference register 40 or comes from an accumulator 30. The flag registers 35, 36 will not be updated on the NO-OP.

CLEAR SEQUENCE

The clear sequence is a "zeroing" operation. When a "Clear" is issued to the UIO-SM, the program counter 41, the repetition counter 42, and the stack pointer 46 are reset to zero and an instruction is fetched. After a "Power-up Clear" has been issued, the accumulators 30 cannot be predicted. However, if a "Clear" is issued while power remains up, the accumulator registers 30 will retain their states just previous to the "Clear". While "Clear" is true, at least two clocks must be issued; after "Clear" has gone false, one clock is required before execution of the first instruction begins.

OUTPUT CONTROL REGISTERS

There are two output control registers 37 and 38 in the UIO-SM as seen in FIG. 2. These can be used by the application dependent logic 60$_L$ to hold "PUT Data" for a longer period of time than can normally occur directly off of the I/O bus 10. Both output control registers 37 and 38 are 8-bits wide and have their data inputs connected to the lower order 8 bits of the I/O bus 10 ("B" byte). Both of these output control registers must be clocked by the application dependent logic 60$_L$. FIG. 5 illustrates a preferred method for clocking the output control registers 37 and 38. A triple input NAND gate 74 in FIG. 5 has three input line signals: PUT STROBE/signal; address signals for an external register (60 of FIG. 2); and the clock signal. These signals are correlated in FIG. 5.

Once clocked by a leading edge, the outputs of these registers will stabilize in 17 nanoseconds or less. A Schottky TTL NAND device 74 is used for the control register clock generator since the "PUT Data" can be guaranteed for only 10 nanoseconds past the leading edge of CLOCK as received on the UIO-SM, and the output control registers require a data hold time of 2 nanoseconds minimum past the leading edge of their clock.

MEMORY ADDRESSING AND EXPANSION

In the preferred embodiment and without expansion of memory, the UIO-SM has the capability of directly addressing 0 to 64K words of program memory 50, FIG. 2, and from 0 to 32K words of data memory in RAM 90. To facilitate any further expansion of memory, such as by using paging techniques or otherwise, the enabling of the program PROM 50 in the UIO-SM can be controlled by an expanded memory in the application dependent logic 60$_L$.

FIG. 6 illustrates how such an expanded memory can control the enabling of the UIO-SM program PROM 50 through the use of a front-plane external signal. If the expanded memory drives this signal to a "high" level, the UIO-SM program PROM 50 will be disabled. If the application dependent logic 60$_L$ does not have a requirement for expanded memory, then it will simply tie this line to a logic "low". In FIG. 6, a 5-input NOR gate 75 has inputs from program counter 41 in order to provide a parity disable signal (high) to disable PROM 50.

The UIO-SM program PROM 50 may be expanded from 8K up to 64K words by using different size PROMs. The chip select and the addressing functions of the PROM 50 are automatically adjusted without circuit changes. A jumper arrangement is used to enable the parity bit output for the size of the program memory being used. With reference to FIG. 6, jumpers can be installed according to the following Table VI for each word size of PROM shown below.

TABLE VI

| | |
|---|---|
| 8K PROM | A15 to MADR 15 |
| | A14 to MADR 14 |
| | A13 to MADR 13 |
| 16K PROM | A15 to MADR 15 |
| | A14 to MADR 14 |

TABLE VI-continued

| | |
|---|---|
| 32K PROM | A13 to GND |
| | A15 to MADR 15 |
| | A14 to GND |
| 64K PROM | A15 to GND |
| | A14 to GND |
| | A13 to GND |

The UIO-SM receives its clock signal from the backplane of the UIO base module. To receive clock signals, the UIO-SM preferably uses Schottky type flip-flops followed by Schottky type inverters in order to generate the internal UIO-SM clock (CLOCK). All the timings are relative to this internal clock which preferably has a minimum delay of four nanoseconds and a maximum delay of 13 nanoseconds from the clock on the backplane. In order to insure minimum clock skew between the application logic $60_L$ and the UIO-SM, the application logic $60_L$ is preferably made to use the same type of devices to receive and distribute the clock.

The following paragraphs will illustrate detailed timing and explanation for the interface between the UIO-SM and the application dependent logic $60_L$.

Referring to FIG. 7, which is entitled "Clear Line Timing", it will be seen that in order to initialize the UIO-SM, the CLEAR line must be "true" (active low) for at least two full clock periods.

Another feature implemented into the UIO-SM is the WAIT line (WAIT/). This is used such that when "slow memory" is addressed, the slow memory can force the UIO-SM to wait however long required for the "read" or the "write" to be valid. This line can also be used to halt the machine for any length of time required. The timing requirements for the WAIT/ line are illustrated in FIG. 8. Since this line has multiple sources, including one line on the UIO-SM itself, it must be driven by an open-collector (TTL device).

A CLOCK enable (CLOCKENB) line is implemented on the UIO-SM for use in single pulse or for direct memory access (DMA) functions. The timing here is the same as the WAIT/ of FIG. 8.

GET/PUT TIMINGS

The timing relationships for the non-repeated GET's and PUT's are illustrated n FIG. 9. The WAIT line can be used on the GET to increase the memory write time in the case of a "slow" write memory. Another application for use of the WAIT line on GET's is to increase the amount of time available for the application dependent logic $60_L$ to drive the "GET DATA" and meet set-up times after having received the GET enable signal.

In the case of the PUT OP, the effect of the WAIT line is to increase the period of time that "PUT DATA" is on the I/O bus 10, although the UIO-SM would be halted during this time. It should also be noted that the timing of the PUT Strobe can only be guaranteed relative to the CLOCK signal and not relative to the PUT DATA. As such, neither edge of the PUT Strobe is used to directly clock the PUT Data into an application dependent register 60.

The first transfer of data in a "repeated" GET to an addressed register in accumulator 30 will be invalid. All data transfers (after the first) will be valid. The same accumulator register 30 is addressed as a "destination" for each repeat GET operation.

If M=1 (refer to Table I), the memory reference register 40 will be incremented during each repeat GET opeation, even though external RAM memory 90 is not used by the GET operator.

The timing relationships for repeated GET's and repeated PUT's are shown in FIG. 10. Specifically this timing chart further illustrates when repeated "GET Data" can change and when repeated "PUT Data" will also change.

The timing relationships for memory "Reads" in the UIO-SM are shown in FIG. 11. The WAIT line has been utilized on one of the memory reads to illustrate how one (or more) extra clock periods can be inserted after address stabilization to allow "slow access" memory to meet the setup time requirements of the UIO-SM.

In regard to the memory "Write" timings for the UIO-SM, these memory Writes are shown in FIG. 12. UIO-SM instructions which can do memory Writes are: WRTW (Write Word), WRTB (Write Byte) and also GET. The WAIT line 11 has been utilized on one of the memory Writes to illustrate how one (or more) extra clock periods can be inserted after address stabilization in order to allow "slow" Write memory an adequate Write time.

HALTING "REPEATED" INSTRUCTIONS

Although the total number of operations on a repeated instruction may not be completed, the repeated instruction itself can be halted by the application dependent logic $60_L$. The application dependent logic produces the signal HLTREP/ (active low), which is the signal to the UIO-SM that halts the repetition. In FIG. 13 there is shown the timing of this signal. If the application dependent logic $60_L$ has no requirement for halting repeated instructions, then the application dependent logic can simply leave the HLTREP/ signal unconnected.

When the HLTREP signal goes false, the current processing operation will be completed and a fetch of the next instruction is started at the "high" clock transition. The HLTREP/ line must remain "high" during repeat operations using the program counter (PC) 41 to address the memory operands (M bit=0).

PARITY ERROR LINE

On every memory fetch the UIO-SM checks for odd parity and signals the results to the application dependent logic $60_L$. If incorrect parity is detected, the UIO-SM takes no action other than to signal the error to the aplication dependent logic $60_L$. This timing of the parity error line PARERR/ is shown in FIG. 14.

Referring to FIG. 3 and to the memory reference register 40 (MRR) there is a line which is used by external memory mapping logic to control address bit 15 of the memory reference register 40. This line is designated as MRR 15 and the state of this line is loaded in MRR 40 at bit 15 whenever a loading of memory reference register 40 is called for by a UIO-SM instruction. The state of this line should be stable for at least 30 nanoseconds prior to the high transition of the clock to ensure that it can be properly loaded. This line is tied to ground (low side) if memory mapping is not used.

There is a line designated IRQ/ on bus 11 which line is the "interrupt request line". This line is driven "low" preferably by an open-collector device in order to request an interrupt of the UIO-SM. The UIO-SM will only recognize an interrupt request if the interrupt mask is reset (EI instruction executed, Table XXI-F, for resetting the interrupt mask bit) and an instruction fetch has just been completed when not in repeat mode (high clock transition at end of T0 and the start of T1).

The UIO-SM responds to an interrupt by forcing execution of an ICALL instruction and switching the UIO-SM "background" mode "on". The ICALL instruction generates an acknowledge signal (ACKI/) in order to allow the application logic 60$_L$ to place an interrupt call address on the I/O bus 10. The ICALL instruction saves the memory reference register 40 data in the MRR save register 47 and it saves the old PC (program counter) value on the stack before loading PC with the call address (placed on the I/O bus 10 by the application logic 60$_L$). Further interrupts are inhibited in the "background" mode and the duplicate set of flags (35) and accumulators (30$_f$) are used so that the "foreground" operating environment is preserved therein.

A return to the "foreground" mode is accomplished by executing an IRET instruction. The top value from the stack memory 45 is placed in the program counter PC 41 for the return address and the contents of the MRR save register 47 is placed into the memory reference register MRR 40. The original foreground flag 35 and foreground accumulator 30$_f$ are again made active and contain the same values as before the interrupt. The clear line will place the UIO-SM in the "foreground" mode and set the interrupt mask to disable interrupts. The IRQ/ line must be stable at least 60 nanoseconds before the leading edge (high transition) of the clock signal.

The DMA request line 11 of FIG. 3 is a line which is driven "low" by the application dependent logic 60$_L$ in order to isolate the UIO-SM address outputs on memory address bus line 16 so that direct memory access (DMA) logic can drive this bus. This line is left unconnected when not using the DMA.

The bus enable line (BUSEN/LINE) from Control Logic 66 is driven "low" by the application logic 60$_L$ in order to enable the I/O bus drivers on I/O bus 10, including data, GETENB, PUTSTB and REGADR signals. The GETENB is a signal used to indicate that GET data is driven on to the I/O bus 10; the PUTSTB is the signal used to indicate that PUT data is on the I/O bus 10; the REGADR signal is the signal used to indicate the enabling of the external register address lines for GET's and PUT's. When "high", this line disables all I/O signals. This line is tied to "low" if it is not used.

UNIVERSAL INPUT/OUTPUT STATE MACHINE FRONT PLANE INTERFACE

The front plane connectors (FIG. 4A, FIGS. 4B-1, 4B-2) which provide the interface for the UIO-SM are preferably four in number wherein each of the four front plane connectors provides 25 pin connections on each of two sides of each front plane connector. The following Tables VII-X show the signal name for each pin number for each side of the four front plane connectors.

TABLE VII

| | (Connector No 1) (See FIG. 4B-1) | |
|---|---|---|
| PIN Number | $ SIDE* SIGNAL NAME | # SIDE* SIGNAL NAME |
| 00 | MADDR15 | MADDR14 |
| 01 | MADDR13 | MADDR12 |
| 02 | MADDR11 | MADDR10 |
| 03 | MADDR09 | MADDR08 |
| 04 | MADDR07 | GND |
| 05 | MADDR06 | MADDR05 |
| 06 | MADDR04 | MADDR03 |

TABLE VII-continued

| | (Connector No 1) (See FIG. 4B-1) | |
|---|---|---|
| PIN Number | $ SIDE* SIGNAL NAME | # SIDE* SIGNAL NAME |
| 07 | MADDR02 | MADDR01 |
| 08 | MADDR00 | MRR15 |
| 09 | BUSREQ/ | GETSTB |
| 10 | IRQ/ | PROMENB/ |
| 11 | IOBUS15 | IOBUS14 |
| 12 | IOBUS13 | IOBUS12 |
| 13 | IOBUS11 | IOBUS10 |
| 14 | IOBUS09 | IOBUS08 |
| 15 | IOBUS07 | IOBUS06 |
| 16 | IOBUS05 | IOBUS04 |
| 17 | IOBUS03 | IOBUS02 |
| 18 | IOBUS01 | IOBUS00 |
| 19 | IOBUSPAR | REGADDR4 |
| 20 | REGADDR3 | GND |
| 21 | REGADDR2 | REGADDR1 |
| 22 | REGADDR0 | FLAG3/ |
| 23 | FLAG2/ | FLAG1/ |
| 24 | HALTREP/ | ACKI/ |

*Note: One side of connector is designated $ while the other side is designated #

TABLE VIII

| | (Connector No. 2) (See FIG. 4B-1) | |
|---|---|---|
| PIN NUMBER | $ SIDE SIGNAL NAME | # SIDE SIGNAL NAME |
| 25 | MEMOUT15 | MEMOUT14 |
| 26 | MEMOUT13 | MEMOUT12 |
| 27 | MEMOUT11 | MEMOUT10 |
| 28 | MEMOUT09 | MEMOUT08 |
| 29 | MEMOUT07 | GND |
| 30 | MEMOUT06 | MEMOUT05 |
| 31 | MEMOUT04 | MEMOUT03 |
| 32 | MEMOUT02 | MEMOUT01 |
| 33 | MEMOUT00 | MEMOUTPA |
| 34 | OCREG107 | OCREG106 |
| 35 | OCREG105 | OCREG104 |
| 36 | OCREG103 | OCREG102 |
| 37 | OCREG101 | OCREG100 |
| 38 | OCREG207 | OCREG206 |
| 39 | OCREG205 | OCREG204 |
| 40 | OCREG203 | OCREG202 |
| 41 | OCREG201 | OCREG200 |
| 42 | OCREG1CK | OCREG2CK |
| 43 | RAMRD/ | PUTSTB3/ |
| 44 | PUTSTB2/ | PUTSTB1/ |
| 45 | CLKEN | GND |
| 46 | unused | WAIT/ |
| 47 | unused | CLEAR/ |
| 48 | RAMWE/ | unused |
| 49 | GETENB/ | PARERR/ |

TABLE IX

| | (Connector No. 3) (See FIG. 4B-2) | |
|---|---|---|
| PIN NUMBER | $ SIDE SIGNAL NAME | # SIDE SIGNAL NAME |
| 50 | BUSEN/ | |
| 51 | BUSEN/ | |
| 52 | IFETCH/ | |
| 53 | IFETCH/ | |
| 54 | BKG/FRG | |
| 55 | BKG/FRG/ | |

Figure 4B:
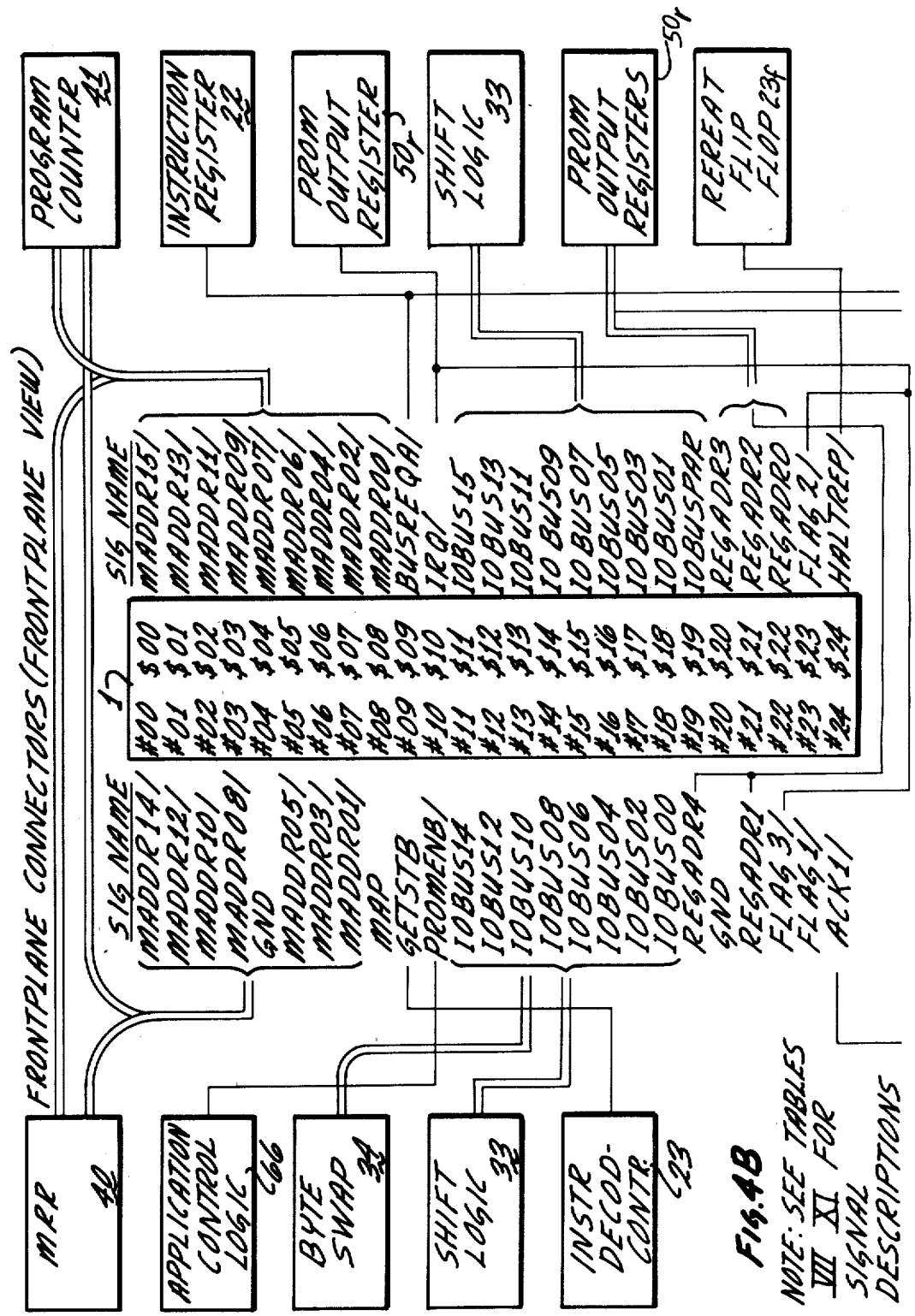
FIG. 4B is a schematic drawing showing circuit connections to the four front plane connectors.
Figures 1, 4B:
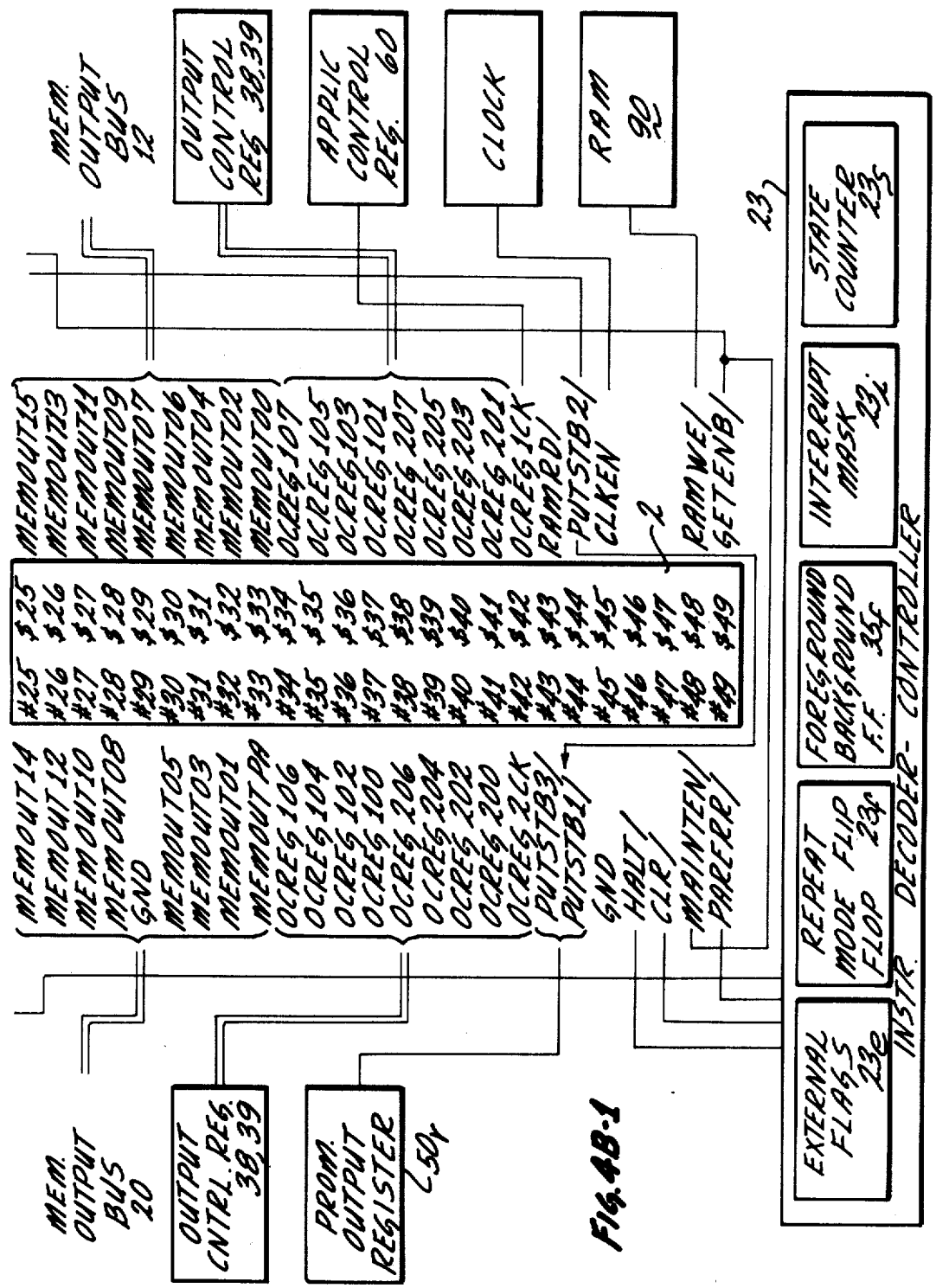
Figures 3, 4B:
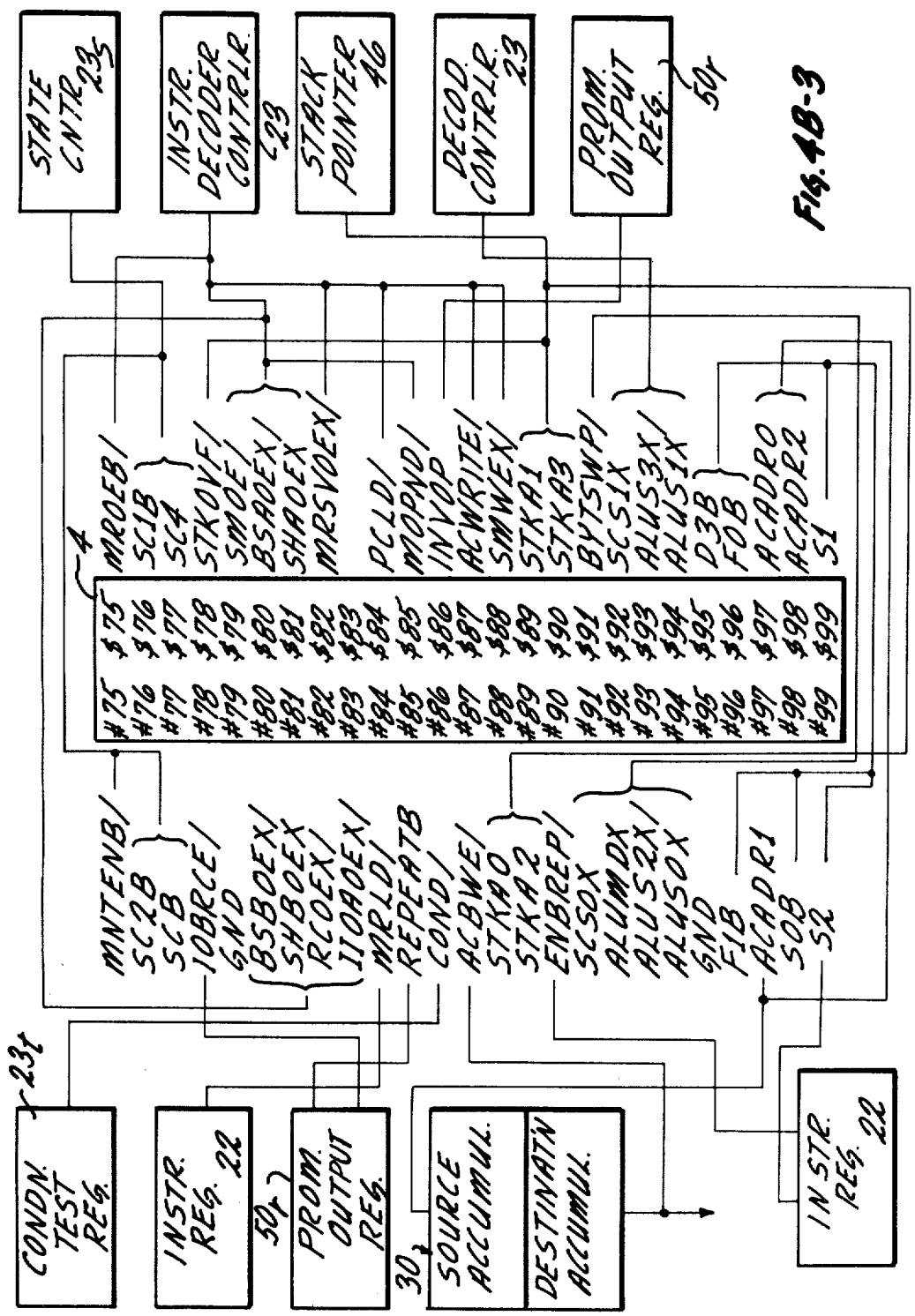

Note:
FIGS. 4B-1 and 4B-2 show in more detail the connectors 1, 2, 3, 4 of FIG. 4A.

In addition to the microprocessor system elements shown in FIG. 2, FIG. 4B-1 indicates the connections to the PROM output registers 50$_r$ and sub-elements of the instruction decoder-controller such as the repeat-mode flip-flop 42$_r$ and foreground-background flip-flop 35$_f$. FIG. 4B-2 shows further connections to the microprocessor system and includes a condition test register 23$_t$.

TABLE X

(Connector No. 4) (See FIG. 4B-2)

| PIN NUMBER | $ SIDE SIGNAL NAME | # SIDE SIGNAL NAME |
|---|---|---|
| 75 | MR0EB | MNTENB/ |
| 76 | SC1B | SC2B |
| 77 | SC1B | SC8 |
| 78 | STK0VF/ | |
| 79 | SMOE/ | GND |
| 80 | BSAEOX/ | BSBOEX/ |
| 81 | SHAOEX | SHBOEX |
| 82 | MRSVOEX | RCOEX |
| 83 | | IIOAOEX/ |
| 84 | FCLD/ | MRLD/ |
| 85 | MOPND/ | REPEATB |
| 86 | INVOP | COND/ |
| 87 | ACWRITE/ | ACBWE/ |
| 88 | SMWEX/ | STKA0 |
| 89 | ASTKA1 | STKA2 |
| 90 | STKA3 | ENREP/ |
| 91 | BYTSWP B | SCSOX |
| 92 | SCSIX | ALUMDX |
| 93 | ALUS3X | ALUS2X |
| 94 | ALUS1X | ALUS0X |
| 95 | D3B | GND |
| 96 | F0B | F1B |
| 97 | ACADR0 | ACADR1 |
| 98 | ACADR2 | S0B |
| 99 | S1 | S2 |

Table XI is a glossary of the front plane signal names for the Universal I/O State Machine. This glossary shows the signal name, the number of the front plane connector involved, when the signal is a Fan-in or a Fan-out signal, and, in addition, a functional description of the signal involved.

TABLE XI
GLOSSARY OF UIOSM FRONTPLANE SIGNAL NAMES

| | SIGNAL NAME | CONNECTOR NUMBER | FAN-IN/ FAN-OUT* | DESCRIPTION |
|---|---|---|---|---|
| 1. | MADDR15- MADDR00 | 1 | FD 75/40 | Memory Address Bus |
| 2. | IRQ/ | 1 | FI 1.25/3.16 (includes 1100 ohm pull-up res) | Line that is used to to interrupt the UIOSM. |
| 3. | PROMENB/ | 1 | FI 2.25/1.5 | Expanded memory in the application dependent logic can drive this line which when high will allow the enabling of the program PROM on the UIOSM. |
| 4. | IOBUS15- IOBUS00 | 1 | FO 373/38.75 FI 2.5/1.5 | BUS lines for GET data to UIOSM (or RAM) or PUT data to application dependent logic. |
| 5. | IOBUSPAR | 1 | FO 25/12.5 | Odd parity line for IOBUS15-IOBUS00. |
| 6. | REGADDR4- REGADDR0 | 1 | FO 75/40 | External register address lines for GET's and PUT's |
| 7. | BUSREQ/ | 1 | FI 5.75/9.65 | When this line is held low the UIOSM address outputs are tri-stated. When this line returns high the Program Generator will be output on the address bus. |
| 8. | FLAG3/- FLAG1 | 1 | FI 1.25/3.16 | Condition test lines used by program stack operators. |
| 9. | HALTREP/ | 1 | FI 1.25/4.25 | Line which will stop a repeated instruction |
| 10. | MRR15 | 1 | FI 1.25/0.25 | Line that is used by mapping logic to control bit 15 of the memory reference register (MRR15). This line should be tied low if mapping is not used. |
| 11. | MEMOUT15- MEMOUT00 | 2 | FI 1.25/.25 | Memory output bus. |
| 12. | MEMOUTPA | 2 | FI 1.25/.25 | Memory output bus odd parity line. |
| 13. | OCREG107- OCREG100 OCREG207- OCREG200 | 2 | FO 160/12.5 | Output control register output data lines. |
| 14. | OCREG1CK OCREG2CK | 2 | FI 1.25/0.25 | Clock line for output control registers. |
| 15. | ACKI/ | 1 | FO 75/40 | Line that acknowledges that an interrupt request is being accepted by the UIOSM. When this signal is low, the application logic should place an interrupt call address on the I/O bus. |
| 16. | PUTSTB3/- PUTSTB1 | 2 | FO 75/40 | Lines that indicate PUT data is on the I/O bus. |
| 17. | RAMRD/ | 2 | FO 23.25/11.25 | This line goes high at least 30 ns before RAMWE/ goes low. It may be used by application logic for generating a synchronized version of RAMWE/. |
| 18. | WAIT/ | 2 | FI 1.25/4 (includes 1100 ohm pull-up res) | Line which causes the UIOSM to wait one or more clock periods. |
| 19. | CLR/ | 2 | FI 1.25/3.16 (includes 1100 ohm pull- | Line which causes the UIOSM to clear. |

TABLE XI-continued
GLOSSARY OF UIOSM FRONTPLANE SIGNAL NAMES

| SIGNAL NAME | CONNECTOR NUMBER | FAN-IN/ FAN-OUT* | DESCRIPTION |
|---|---|---|---|
| | | up res) | |
| 20. RAMWE/ | 2 | FO 25/12.5 | Write enable for RAM. |
| 21. GETENB/ | 2 | FO 23/11.25 | Line which indicates that GET data should drive into the I/O bus. |
| 22. PARERR/ | 2 | FO 25/12.5 | Line that indicates a parity error was detected on the previous memory fetch. |
| 23. CLKEN | 2 | FI 1.25/4 (includes 1100 ohm pull-up res) | Line that enables the UIOSM clock when high. |
| 24. GETSTB | 1 | FO 25/12.5 | Line used with GETENB/ for application timing. |
| 25. BUSEN/A BUSEN/B | 3 | FI 5/5 | When these lines go high, the I/O bus is disabled. |
| 26. IFETCH/A IFETCH/B | 3 | FO 75/40 | When low, these signals indicate that an instruction OP code is being fetched. |
| 27. BKG/FRGA BKG/FRGB | 3 | FO 75/40 | When these signals are high, the UIOSM is processing an interrupt (running in background mode). |
| 28. MROEB/ | 4 | FO 75/40 | When low, this signal indicates that MRR is being output on the address bus. |
| 29. SC1B,SC2B, SC4, SC8 | 4 | FO 75/40 FO 20/11.25 | Outputs of the State counter. |
| 30. MNTENB/ | 4 | FI 10/5.5 | When low, this line will tri-state the outputs of the five instruction decode PROMS. |
| 31. SMOE/ | 4 | FO 20423/8.83 | When low, this signal indicates that the stack memory is being output on the I/O bus. |
| 32. BSAOEX/BSBOEX | 4 | FO 47.75/0.81 | When low, these signals indicate that byte A or B of the byte swap logic will be output on the I/O bus during the next clock. |
| 33. SHAOEX/SHBOEX | 4 | FO 47.75/9.81 | When high, these signals indicate that byte A or B of the shift logic will be output on the I/O bus during the next clock. |
| 34. MRSVOEX/ | 4 | FO 49/9.81 | When low, this signal indicates that the MRR save register will be output on the I/O bus during the next clock. |
| 35. RCOEX/ | 4 | FO 47.75/9.81 | When low, this signal indicates that the repeat counter will be output on the I/O bus during the next clock. |
| 36. IIOAEX/ | 4 | FO 47.75/9.81 | When low, this signal indicates that the most significant (A) byte of the I/O bus will be driven to all zeros during the next clock. |
| 37. PCLD/ | 4 | FO 48/8.98 | When low, this signal indicates that the program counter will be loaded from the I/O bus at the next clock. |
| 38. STKOVF/ | 4 | FO 25/12.5 | This signal goes low during a CALL when this stack address is at maximum (15), or during a RETURN when the stack address is zero. |
| 39. MRLD/ | 4 | FO 3.75/4.75 | When low, this signal indicates that MRR will be loaded from the I/O bus at the next clock. |
| 40. REPEATB | 4 | FO 75/40 | When high, this signal indicates that a repeat operation is in progress. |
| 41. MOPND/ | 4 | FO 48/8.98 | When low, this signal indicates that the memory date being read will be used during the next clock. This signal will be high for unused read data and during memory write cycles. |
| 42. COND/ | 4 | FO 173.75/12.47 | When low during a BRANCH, CALL or RETURN, this signal indicates that the selected condition is true. |
| 43. INVOP | 4 | FO 206.75/9.47 | When high this signal indicates that an invalid condition was detected in the state machine. Conditions that will cause this term to go high are:<br>1. IRETURN with D3=0.<br>2. Repeat made with CALL, BRANCH, RETURN, ICALL or IRETURN operators<br>3. GET or PUT with the state count greater than 1.<br>4. CALL, BRANCH, RETURN, ICALL and RETURN with the state count greater than 2. |

TABLE XI-continued
GLOSSARY OF UIOSM FRONTPLANE SIGNAL NAMES

| SIGNAL NAME | CONNECTOR NUMBER | FAN-IN/ FAN-OUT* | DESCRIPTION |
|---|---|---|---|
| | | | 5. ALU operators other than LOWD, STD, EI, OI, ADDC, SUBC and RSTK with the state count greater than 1. |
| | | | 6. Repeat made with the state count not equal to 1. |
| | | | 7. STWD or LDWD with D=0000. |
| 44. ACBWE/ | 4 | FO 23.74/12.18 | When low, this signal indicates the "B"(low order) byte of the selected accumulator register is enabled for writing. |
| 45. ACWRITE/ | 4 | FO 7.49/8.43 | When low, this signal indicates that the selected accumulator is being written. The"A " (high order) byte is always written and the "B"(low order) byte is controlled by the ACBWE/ signal. |
| 46. STKA0 STKA1 STKA2 STKA3 | 4 | FO 22.48/11 | Program stack address. |
| 47. SMWEX/ | 4 | FO 47.75/9.81 | When low, this signal indicates that the program stack will be written from the I/O bus on the next clock. |
| 48. ENBREP/ | 4 | FO 24/12 | When low, this signal indicates a PUT to the repeat counter is taking place and a repeat operation will start on the next clock. |
| 49. BYTSWPB | 4 | FO 75/40 | When high, this signal indicates that the byte-swap bit is set. |
| 50. SCS0X SCS1X | 4 | FO 47.75/9.81 | These signals indicate that the shift function will be on the next clock: |

| SCS0X | SCS1X | function |
|---|---|---|
| 0 | 0 | shift rt. |
| 1 | 0 | no shift |
| 0 | 1 | shift 1ft. |
| 1 | 1 | double shift 1ft. |

| SIGNAL NAME | CONNECTOR NUMBER | FAN-IN/ FAN-OUT* | DESCRIPTION |
|---|---|---|---|
| 51. ALUMDX ALUS3X/ ALUS2X/ ALUS1X ALUS0X | 4 4 4 4 4 | FO 47.75/9.81 FO 47.75/9.81 FO 47.75/9.81 FO 46.5/9.66 FO 46.5/9.66 | These signals indicate what the ALU function will be on the next clock: |

| MD | S3 | S2 | S1 | S0 | Func. |
|---|---|---|---|---|---|
| 1 | 0 | 0 | 1 | 1 | F = A |
| 1 | 0 | 1 | 1 | 0 | F = B |
| 0 | 0 | 1 | 0 | 1 | F = A + B |
| 0 | 0 | 0 | 1 | 1 | F = A − 1 |
| 0 | 1 | 1 | 0 | 0 | F = A + 1 |
| 0 | 1 | 0 | 1 | 0 | F = A − B |
| 1 | 0 | 1 | 1 | 1 | F = A & B |
| 1 | 1 | 0 | 0 | 1 | F = B/ |
| 1 | 1 | 1 | 0 | 0 | F = A/ |
| 1 | 0 | 0 | 0 | 0 | F = 1's |
| 1 | 0 | 0 | 1 | 0 | F = A or B |
| 1 | 1 | 1 | 1 | 1 | F =O's |

(F = ALU output, A = Accumulator, B = Memory)

| SIGNAL NAME | CONNECTOR NUMBER | FAN-IN/ FAN-OUT* | DESCRIPTION |
|---|---|---|---|
| 52. D3B | 4 | FO 75/40 | These signals are copies of instruction register bits. |
| F1B | 4 | FO 75/40 | |
| F0B | 4 | FO 75/40 | |
| S2 | 4 | FO 159.75/11.47 | |
| S1 | 4 | FO 159.75/11.47 | (F = Function, D = Destination, |
| S0B | 4 | FO 75/40 | S = Source) |
| 53. ACADR2 | 4 | FO 17.48/9.36 | Accumulator address. |
| ACADR1 | 4 | FO 17.48/9.36 | When the state machine internal clock is high, the source accumulator address is present on these signals. When the clock is low the destination accumulator address is present. |
| ACADR0 | 4 | FO 17.48/9.36 | |
| 54. IOBRCE/ | 4 | FO | When low, this signal causes the I/O bus to go from transmit (output) to receive (input) mode. The signal may be driven from the foreplane with an open-collector driver to control the I/O bus for maintenance purposes. |
| 55. MRR/.A | 3 | FO 75/40 | When low, these signals indicate that MRR is |

TABLE XI-continued

GLOSSARY OF UIOSM FRONTPLANE SIGNAL NAMES

| SIGNAL NAME | CONNECTOR NUMBER | FAN-IN/ FAN-OUT* | DESCRIPTION |
|---|---|---|---|
| MRR/.B | | | output on the address bus. |

*The Fan-in (FI) or Fan-out (FO) is expressed as H/L where H is the high level FI or FO and L is the low level FI or FO. FI or FO is from the point of view of the UIOSM, and is expressed in standard TTL unit loads (40 μA high; and −1.6 mA low)

Note:
Only one each of the following groups of signals will be active on the foreplane at a time. Group A or B will be selected by jumper options for use in a multiple-processor environment. This allows memory/DMA logic to recognize requests from two distinct state machines:
1. BUSEN/A
   BUSEN/B
2. IFETCH/A
   IFETCH/B
3. BKG/FRGA
   BKG/FRGB
4. MRR/.A
   MRR/.B The following Tables XII and XII-A through G show the operators of the UIO State Machine

TABLE XII

UIO STATE MACHINE OPERATORS
NOTES:

(a) The "M" bit is not listed under each operator since it always has the same meaning as earlier defined and actually appears in the instruction to which it applies.
(b) Additionally, the "C" bit is not listed under each operator, since it always has the same meaning as earlier defined.
(c) The following flags are conditioned by ALU operators:
  1. The carry flag is only updated during ADD, SUBT, INCR, DECR, ADDC, AND SUBC operators.
  2. The ALU = 0 flag is set if the output of the ALU is all zero's.
  3. The MSB flag is set if bit 15 of the I/O bus is zero.
  4. The LSB flag is set if bit 0 of the I/O bus is zero.
(d) X = don't care

TABLE XII-A:

ARITHMETIC OP'S

1. ADD — Places the results of a binary ADD of accumulator A(S) and memory into accumulator A(D), and/or into the memory reference register (MRR), or merely updates the flag register (null). If the ADD overflows, the carry flag will go true.
   F = 10
   V = 00000
   D = 1[A (D)]    Accumulator A(D)
       0001        Null
   S = [A (S)]     Accumulator A(S)

2. DECR — PLACES THE RESULTS OF MEMORY MINUS 1 INTO ACCUMULATOR A(D), AND/OR INTO THE MEMORY REFERENCE REGISTER (MRR), OR MERELY UPDATES THE FLAG REGISTER (NULL). IF THE DECR UNDERFLOWS, THE CARRY FLAG WILL GO FALSE.
   F = 10
   V = 00001
   D = 1[A(D)]     ACCUMULATOR A(D)
       0001        NULL
   S = XXX

3. INCR — PLACES THE RESULTS OF MEMORY PLUS 1 INTO ACCUMULATOR A(D), AND/OR INTO THE MEMORY REFERENCE REGISTER (MRR), OR MERELY UPDATES THE FLAG REGISTER (NULL). IF THE INCR OVERFLOWS, THE CARRY FLAG WILL GO TRUE.
   F = 10
   V = 00010
   D = 1[A(D)]     ACCUMULATOR A(D)
       0001        NULL
   S = XXX

4. ROTL — PLACES THE RESULTS OF A LEFT ROTATE BY ONE BIT (MSB INTO LSB) ON ACCUMULATOR A(S) INTO ACCUMULATOR A(D) OR MERELY

TABLE XII-A:-continued

ARITHMETIC OP'S

UPDATES THE FLAG REGISTER (NULL). THE CARRY FLAG IS NOT AFFECTED.
   F = 10
   V = 00011
   D = 1[A(D)]     ACCUMULATOR A(D)
       0001        NULL
   S = [A(S)]      ACCUMULATOR A(S)

5. ROTR — PLACES THE RESULTS OF RIGHT ROTATE BY ONE BIT (LSB INTO MSB) ON ACCUMULATOR A(S) INTO ACCUMULATOR A(D) OR MERELY UPDATES THE FLAG REGISTER (NULL). THE CARRY FLAG IS NOT AFFECTED.
   F = 10
   V = 00100
   D = 1[A(D)]     ACCUMULATOR A(D)
       0001        NULL
   S = [A(S)]      ACCUMULATOR A(S)

6. SHFL — PLACES THE RESULTS OF A LEFT SHIFT BY ONE BIT (ZERO SHIFTED INTO LSB) ON ACCUMULATOR A(S) INTO ACCUMULATOR A(D) OR MERELY UPDATES THE FLAG (NULL). THE CARRY FLAG IS NOT AFFECTED.
   F = 10
   V = 00101
   D = 1[A(D)]     ACCUMULATOR A(D)
       0001        NULL
   S = [A(S)]      ACCUMULATOR A(S)

7. SHFM — PLACES THE RESULTS OF A LEFT SHIFT BY ONE BIT (ZERO SHIFTED INTO LSB) ON MEMORY INTO ACCUMULATOR A(D), AND/OR INTO THE MEMORY REFERENCE REGISTER (MRR), OR MERELY UPDATES THE FLAG REGISTER (NULL). THE CARRY FLAG IS NOT AFFECTED.
   F = 10
   V = 00110
   D = 1[A(D)]     ACCUMULATOR A(D)
       0001        NULL
   S = XXX

8. SHFR — PLACES THE RESULTS OF A RIGHT SHIFT BY ONE BIT (ZERO SHIFTED INTO MSB) ON ACCUMULATOR A(S) INTO ACCUMULATOR A(D) OR RAM, OR MERELY UPDATES THE FLAG REGISTER (NULL). THE CARRY FLAG IS NOT AFFECTED.
   F = 10
   V = 00111
   D = 1[A(D)]     ACCUMULATOR A(D)
       0001        NULL
   S = [A(S)]      ACCUMULATOR A(S)

9. SUBT — PLACES THE RESULTS OF A BINARY SUBTRACT ON MEMORY AND ACCUMULATOR A(S) (MEMORY MINUS A(S)) INTO ACCUMULATOR A(D), AND/OR INTO THE MEMORY REFERENCE REGISTER (MRR), OR MERELY UPDATES THE FLAG REGISTER (NULL). IF THE SUBT UNDERFLOWS, THE CARRY FLAG

TABLE XII-A:-continued
ARITHMETIC OP'S

WILL GO FALSE.
F = 10
V = 01000
D = 1[A(D)]    ACCUMULATOR A(D)
    0001       NULL
S = [A(S)]     ACCUMULATOR A(S)

10. DRTL  PLACES THE RESULTS OF A LEFT ROTATE
BY 2 BITS ON ACCUMULATOR A(S) INTO
ACCUMULATOR A(D) OR RAM, OR MERELY
UPDATES THE FLAG REGISTER (NULL).
THE CARRY FLAG IS NOT AFFECTED.
V = 10111
D = 1[A(D)]    ACCUMULATOR A(D)
    0001       NULL
S = [A(S)]     ACCUMULATOR A(S)

TABLE XII-B
LOGICAL OP'S

1. AND    PLACES THE RESULTS OF A LOGICAL AND
ON ACCUMULATOR A(S) AND MEMORY
A * M) INTO ACCUMULATOR A(D),
AND/OR INTO THE MEMORY REFERENCE
REGISTER (MRR), OR MERELY UPDATES
THE FLAG REGISTER (NULL). THE CARRY
FLAG IS NOT AFFECTED.
F = 10
V = 01001
D = 1[A(D)]    ACCUMULATOR A(D)
    0001       NULL
S = [A(S)]     ACCUMULATOR A(S)

2. CMA    PLACES THE COMPLEMENT OF ACCU-
MULATOR A(S) INTO ACCUMULATOR
A(D) AND/OR INTO THE MEMORY REF-
ERENCE REGISTER (MRR), OR MERELY
UPDATES THE FLAG REGISTER (NULL).
THE CARRY FLAG IS NOT AFFECTED.
F = 10
V = 01010
D = 1[A(D)]    ACCUMULATOR A(D)
    0001       NULL
S = [A(S)]     ACCUMULATOR A(S)

3. CMM    PLACES THE COMPLEMENT OF MEMORY
INTO ACCU-
MULATOR A(D), AND/OR INTO
THE MEMORY REFERENCE REGISTER
(MRR), OR MERELY UPDATES THE FLAG
REGISTER (NULL). THE CARRY FLAG
IS NOT AFFECTED.
F = 10
V = 01011
D = 1[A(D)]    ACCUMULATOR A(D)
    0001       NULL
S = XXX

4. ONES   SETS ACCUMULATOR A(D) AND/OR THE
MEMORY REFERENCE REGISTER (MRR)
TO ALL ONES OR MERELY UPDATES THE
FLAG REGISTER (NULL). THE CARRY
FLAG IS NOT AFFECTED.
F = 10
V = 01100
D = 1[A(D)]    ACCUMULATOR A(D)
    0001       NULL
S = XXX

TABLE XII-B-continued
LOGICAL OP'S

5. OR     PLACES THE RESULTS OF A LOGICAL OR
ON ACCUMULATOR A(S) AND MEMORY
(A + M) INTO ACCUMULATOR A(D),
AND/OR INTO THE MEMORY REFERENCE
REGISTER (MRR), OR MERELY UPDATES
THE FLAG REGISTER (NULL). THE
CARRY FLAG IS NOT AFFECTED.
F = 10
V = 01101
D = 1[A(D)]    ACCUMULATOR A(D)
    0001       NULL
S = [A(S)]     ACCUMULATOR A(S)

6. XOR    PLACES THE RESULTS OF A LOGICAL
EXCLUSIVE OR ON ACCUMULATOR
A(S) AND MEMORY (A EXOR M) INTO
ACCUMULATOR A(D), AND/OR INTO THE
MEMORY REFERENCE REGISTER (MRR), OR
MERELY UPDATES THE FLAG
REGISTER (NULL). THE CARRY FLAG
IS NOT AFFECTED.
F = 10
V = 01110
D = 1[A(D)]    ACCUMULATOR A(D)
    0001       NULL
S = [A(S)]     ACCUMULATOR A(S)

7. ZERO   SETS ACCUMULATOR A(D) AND/OR THE
MEMORY REFERENCE REGISTER (MRR)
TO ALL ZEROS OR MERELY UPDATES
THE FLAG REGISTER (NULL). THE CARRY
FLAG IS NOT AFFECTED.
F = 10
V = 01111
D = 1[A(D)]    ACCUMULATOR A(D)
    0001       NULL
S = XXX

8. ADDC   PLACES THE RESULTS OF A BINARY ADD
OF ACCUMULATOR A(S), MEMORY, AND
THE CARRY FLAG INTO ACCUMULATOR
A(D), AND/OR INTO THE MEMORY REF-
ERENCE REGISTER (MRR) OR MERELY
UPDATES THE FLAG REGISTER (NULL).
IF THE ADD OVERFLOWS, THE CARRY
FLAG WILL GO TRUE.
F = 10
V = 11100
D = 1[A(D)]    ACCUMULATOR A(D)
    0001       NULL
S = [A(S)]     ACCUMULATOR A(S)

9. SUBC   PLACES THE RESULT OF A BINARY SUB-
TRACT ON MEMORY AND ACCUMULATOR
A(S), LESS THE CARRY FLAG, (MEMORY
MINUS A(S) MINUS CARRY) INTO ACCU
MULATOR A(D), AND/OR INTO THE
MEMORY REFERENCE REGISTER (MRR),
OR MERELY UPDATES THE FLAG
REGISTER (NULL). IF THE SUBT
UNDERFLOWS, THE CARRY FLAG WILL
GO FALSE.
F = 10
V = 11101
D = 1[A(D)]    ACCUMULATOR A(D)
    0001       NULL
S = [A(S)]     ACCUMULATOR A(S)

TABLE XII-C
PROGRAM STACT OP'S

Note: THE FOLLOWING INSTRUCTION DO NOT AFFECT CONDITION FLAGS.

1. BRANCH  IF THE CONDITION TEST IS TRUE, THE PROGRAM COUNTER
(PC) WILL BE REPLACED WITH ACCUMULATOR A(S) OR WITH
A LITERAL STORED IN MEMORY.
F = 11
V = 10000    BRANCH UNCONDITIONALLY (OR NOT)
    10001    BRANCH ON ALU = 0 (OR NOT)
    10010    BRANCH ON ALU MSB = 0 (OR NOT)
    10011    BRANCH ON ALU CARRY = 1 (OR NOT)
    10100    BRANCH ON ALU LSB = 0 (OR NOT)
    10101    BRANCH ON EXTERNAL FLAG 1 = 1 (OR NOT)

TABLE XII-C-continued
PROGRAM STACT OP'S

|  |  |  |  |  |
|---|---|---|---|---|
|  |  | 10110 |  | BRANCH ON EXTERNAL FLAG 2 = 1 (OR NOT) |
|  |  | 10111 |  | BRANCH ON EXTERNAL FLAG 3 = 1 (OR NOT) |
|  |  | D = SXXF | S = 0 | BRANCH ADDRESS IN MEMORY |
|  |  |  | S = 1 | BRANCH ADDRESS IN ACCUMULATOR A(S) |
|  |  |  | F = 1 | EXECUTE ON CONDITION TEST TRUE |
|  |  |  | F = 0 | EXECUTE ON CONDITION TEST NOT TRUE |
|  |  | S = XXX |  | IF BRANCH ADDRESS IS IN MEMORY |
|  |  | [A(S)] |  | IF BRANCH ADDRESS IS IN ACCUMULATOR A(S) |
| 2. | CALL | IF THE CONDITION TEST IS TRUE, THE PROGRAM COUNTER (PC) WILL BE REPLACED WITH ACCUMULATOR A(S) OR WITH A LITERAL STORED IN MEMORY, AND THE OLD PROGRAM COUNT (+1 IF M=1, +2 IF M=0) WILL BE PUSHED INTO THE PROGRAM STACK. UP TO 16 CALLS CAN BE MADE FROM THE INITIAL PROGRAM START POINT. |  |  |
|  |  | F = 11 |  |  |
|  |  | V = 01000 |  | CALL UNCONDITIONALLY (OR NOT) |
|  |  | 01001 |  | CALL ON ALU = 0 (OR NOT) |
|  |  | 01010 |  | CALL ON ALU MSB = 0 (OR NOT) |
|  |  | 01011 |  | CALL ON ALU CARRY = 1 (OR NOT) |
|  |  | 01100 |  | CALL ON ALU LSB = 0 (OR NOT) |
|  |  | 01101 |  | CALL ON EXTERNAL FLAG 1 = 1 (OR NOT) |
|  |  | 01110 |  | CALL ON EXTERNAL FLAG 2 = 1 (OR NOT) |
|  |  | 01111 |  | CALL ON EXTERNAL FLAG 3 = 1 (OR NOT) |
|  |  | D = SXXF | S = 0 | CALL ADDRESS IN MEMORY |
|  |  |  | S = 1 | CALL ADDRESS IN ACCUMULATOR A(S) |
|  |  |  | F = 1 | EXECUTE ON CONDITION TEST TRUE |
|  |  |  | F = 0 | EXECUTE ON CONDITION TEST NOT TRUE |
|  |  | S = XXX |  | IF CALL ADDRESS IS IN MEMORY |
|  |  | [A(S)] |  | IF CALL ADDRESS IS IN ACCUMULATOR A(S) |
| 3. | RETURN | IF THE CONDITION TEST IS TRUE, THE PROGRAM COUNTER WILL BE REPLACED WITH THE LAST VALUE STORED IN THE PROGRAM STACK. |  |  |
|  |  | F = 11 |  |  |
|  |  | V = 11000 |  | RETURN UNCONDITIONALLY (OR NOT) |
|  |  | 11001 |  | RETURN ON ALU = 0 (OR NOT) |
|  |  | 11010 |  | RETURN ON ALU MSB = 0 (OR NOT) |
|  |  | 11011 |  | RETURN ON ALU CARRY = 1 (OR NOT) |
|  |  | 11100 |  | RETURN ON ALU LSB = 0 (OR NOT) |
|  |  | 11101 |  | RETURN ON EXTERNAL FLAG 1 = 1 (OR NOT) |
|  |  | 11110 |  | RETURN ON EXTERNAL FLAG 2 = 1 (OR NOT) |
|  |  | 11111 |  | RETURN ON EXTERNAL FLAG 3 = 1 (OR NOT) |
|  |  | D = 1XX1 |  | EXECUTE ON CONDITION TEST TRUE |
|  |  | 1XX0 |  | EXECUTE ON CONDITION TEST NOT TRUE |
|  |  | S = XX0 |  |  |
| 4. | I CALL | THIS INSTRUCTION IS FORCED BY HARDWARE TO ENTER INTERRUPT MODE. THE BACKGROUND FLAGS AND ACCUMULATOR ARE ACTIVE AFTER THIS INSTRUCTION IS EXECUTED. MRR IS SAVED IN THE MRR SAVE REGISTER AND THEN PC (PC IS INCREMENTED) IS STORED IN THE PROGRAM STACK. THE ADDRESS PROVIDED BY THE APPLICATION LOGIC ON THE I/O BUS IS LOADED IN PC. |  |  |
|  |  | F = 11 |  |  |
|  |  | V = 11111 |  |  |
|  |  | D = 1111 |  |  |
|  |  | S = 111 |  |  |
|  |  | M = 1 |  |  |
|  |  | C = 1 |  |  |
| 5. | IRETURN | EXITS INTERRUPT MODE, RESTORES MRR, AND REPLACES THE PROGRAM COUNTER WITH THE LAST VALUE STORED IN THE PROGRAM STACK. THE FOREGROUND FLAGS AND ACCUMULATORS ARE ACTIVE AFTER THIS INSTRUCTION IS EXECUTED. |  |  |
|  |  | F = 11 |  |  |
|  |  | V = 00XXX |  |  |
|  |  | D = 1XXX |  |  |
|  |  | S = XXX |  |  |
| 6. | BCALL | THIS INSTRUCTION ALLOWS ENTRY INTO BACKGROUND MODE FOR MAINTENANCE PURPOSES. BACKGROUND MODE IS ENTERED AND PC +1 IS STORED ON THE STACK. THE INSTRUCTION AT PC + 1 IS STORED THEN EXECUTED. |  |  |
|  |  | F = 11 |  |  |
|  |  | V = 11111 |  |  |
|  |  | D = 01111 |  |  |
|  |  | S = XX1 |  |  |

TABLE XII-D
LOAD, STORE, AND MOVE OP'S

Note: The following instructions make reference to a memory operand word or source accumulator word as (AB) where the

TABLE XII-D-continued
LOAD, STORE, AND MOVE OP'S left character (A) is the high order byte and the right character (B) is the low order byte.
These instructions will condition all flags except the carry flag.

1. RDW (READ WORD) PLACES THE CONTENTS OF MEMORY (AB) INTO ACCUMULATOR A(D) AS AB, AND/OR INTO THE MEMORY REFERENCE REGISTER (MRR) AS AB, OR MERELY UPDATES THE FLAG REGISTER (NULL).
   F = 10
   V = 10000
   D = 1[A(D)]   ACCUMULATOR A(D)
       0001      NULL
   S = XXX

2. RDB (READ BYTE) PLACES THE CONTENTS OF MEMORY (AB) INTO ACCUMULATOR A(D) AS 0A IF THE BYTE SWAP BIT IS 0 OR AS 0B IF THE BYTE SWAP BIT IS 1.
   F = 10
   V = 10001
   D = 1[A(D)]   ACCUMULATOR A(D)
       0001      NULL
   S = XXX

3. RDBW (READ BEFORE WRITE BTYE) PLACES THE CONTENTS MEMORY (AB) INTO ACCUMULATOR A(D) AS AX IF THE BTYE SWAP BIT IS 1 OR AS BX IF THE BYTE SWAP BIT IS 0. THE X BYTE INDICATES THAT THE DESTINATION ACCUMULATOR A(D) IS UNCHANGED FOR THAT BYTE.
   F = 10
   V = 10010
   D = 1[A(D)]   ACCUMULATOR A(D)
       0001      NULL
   S = XXX

4. RBWR (READ BEFORE WRITE BYTE REVERSED) PLACES THE CONTENTS OF MEMORY (AB) INTO ACCUMULATOR A(D) AS AX IF THE BYTE SWAP BIT IS 0 OR AS BX IF THE BYTE SWAP BIT IS 1. THE X BYTE INDICATES THAT THE DESTINATION ACCUMULATOR A(D) IS UNCHANGED FOR THAT BYTE.
   F = 10
   V = 10110
   D = 1[A(D)]   ACCUMULATOR A(D)
       0001      NULL
   S = XXX

5. SWAC (SWAP ACCUMULATOR) PLACES THE CONTENTS OF ACCUMULATOR A(S) (AB) INTO ACCUMULATOR A(D) AS BA.
   F = 10
   V = 10011
   D = 1[A(D)]   ACCUMULATOR A(D)
       0001      NULL
   S = [A(S)]    ACCUMULATOR A(S)

TABLE XII-D-continued
LOAD, STORE, AND MOVE OP'S

M = 1
6. WRTW (WRITE WORD) PLACES THE CONTENTS OF ACCUMULATOR A(S) (AB) INTO ACCUMULATOR A(D) AS AB, AND/OR INTO THE MEMORY REFERENCE REGISTER (MRR) AS AB, OR INTO RAM MEMORY AS AB, OR MERELY UPDATES THE FLAG REGISTER (NULL).
   F = 10
   V = 10100
   D = 1[A(D)]   ACCUMULATOR A(D)
       0000      RAM MEMORY
       0001      NULL
   S = [A(S)]    ACCUMULATOR A(S)

M = 1
7. WRTB (WRITE BYTE) PLACES THE CONTENTS OF ACCUMULATOR A(S) (AB) INTO ACCUMULATOR A(D) OR RAM MEMORY AS AB IF THE BYTE SWAP BIT IS 1 OR BA IF THE BYTE SWAP BIT IS 0.
   F = 10
   V = 10101      ACCUMULATOR D(S)
   D = 1[A(D)]    RAM
       0001       NULL
   S = [A(S)]     ACCUMULATOR A(S)

M = 1
8. LDWD (LOAD WORD DIRECT) PLACES THE CONTENTS OF MEMORY INTO MRR. PLACES THE CONTENTS OF MEMORY POINTED TO BY THE NEW CONTENTS OF MRR INTO ACCUMULATOR A(D) (AB), AND/OR INTO MRR, OR MERELY UPDATES THE FLAG REGISTER (NULL).
   F = 10
   V = 11000
   D = 1[A(D)]    ACCUMULATOR A(D)
   S = XXX

9. STWD (STORE WORD DIRECT) PLACES THE CONTENTS OF MEMORY INTO MRR. PLACES THE CONTENTS OF ACCUMULATOR A(S) (AB) INTO RAM MEMORY AT THE ADDRESS POINTED AT BY THE NEW MRR VALUE, AND/OR INTO MRR.
   F = 10
   V = 11001
   D = 0001
   S = [A(S)]     ACCUMULATOR A(S)

10. RSTK (READ STACK) PLACES THE CONTENTS OF THE TOP WORD OF THE STACK (RETURN ADDRESS) INTO THE ACCUMULATOR A(D).
    F = 10
    V = 11110
    D = 1 8 A(D)]  ACCUMULATOR A(D)
        0001       NULL
    S = XXX

TABLE XII-E
GET AND PUT OP'S

NOTE: The following instructions do not affect condition flags.

1. GET PLACES CONTENTS OF EXTERNAL REGISTER R(N) OR THE REPEAT COUNTER INTO ACCUMULATOR A(D), OR INTO RAM MEMORY. THE "C" BIT MUST BE 1 IN THE INSTRUCTION. THE "M" BIT MUST BE 1 IN THIS INSTRUCTION.
   F = 00
   V = [R(N)]     EXTERNAL REGISTER R(N)
   D = 1[A(D)]    ACCUMULATOR A(D)
       0000       RAM MEMORY
       0001       NULL
   S = XX0        APPLICATION REGISTER
       XX1        REPEAT COUNTER

2. PUT PLACES CONTENTS OF ACCUMULATOR A(S) OR MEMORY INTO EXTERNAL REGISTER R(N). THREE SEPARATE "STROBE" LINES CAN ALSO BE GENERATED FOR USE BY THE APPLICATION DEPENDENT LOGIC. THE CONTENTS OF ACCUMULATOR A(S) OR MEMORY CAN ALSO BE COPIED TO THE MEMORY REFERENCE REGISTER (MRR).

TABLE XII-E-continued
GET AND PUT OP'S

```
F  = 01
V  = [R(N)]              EXTERNAL REGISTER R(N)
D  = SFFF      S = 0     PUT FROM MEMORY
               S = 1     PUT FROM ACCUMULATOR A(S)
               FFF = 000 GENERATE STROBE #1
               FFF = 001 GENERATE STROBE #2
               FFF = 010 GENERATE STROBE #3
               FFF = 011 LOAD AND ENABLE REPETITION COUNTER
S  = XXX                 IF PUT FROM MEMORY
   [A(S)]                IF PUT FROM ACCUMULATOR A(S)
```

TABLE II-F
MISCELLANEOUS OP'S

NOTE: The following instructions do affect condition flags.

```
1.   EI    RESETS THE INTERRUPT MASK BIT.
           F = 10
           V = 11010
           D = 0001     NULL
           S = XXX
2.   DI    SETS THE INTERRUPT MASK BIT.
           F = 10
           V = 11011
           D = 0001     NULL
           S = XXX
```

TABLE XII-G
ALU OP CODE SUMMARY TABLE (F = 10)

Note: This code summary table for the Function Variant Field V is listed in reference to:
Aritmetic Op's (Table XII-A)
Logical OP's (Table XII-B)
Load, Store, Move OP's (Table XII-D)

| V3 | V2 | V1 | V0 | V4 = 0 | V4 = 1 |
|---|---|---|---|---|---|
| 0 | 0 | 0 | 0 | ADD  | RDW  |
| 0 | 0 | 0 | 1 | DECR | RDB  |
| 0 | 0 | 1 | 0 | INCR | RDBW |
| 0 | 0 | 1 | 1 | ROTL | SWAC |
| 0 | 1 | 0 | 0 | ROTR | WRTW |
| 0 | 1 | 0 | 1 | SHFL | WRTB |
| 0 | 1 | 1 | 0 | SFHN | RBWR |
| 0 | 1 | 1 | 1 | SHFR | DRTL |
| 1 | 0 | 0 | 0 | SUBT | LDWD |
| 1 | 0 | 0 | 1 | AND  | STWD |
| 1 | 0 | 1 | 0 | CMA  | EI   |
| 1 | 0 | 1 | 1 | CMM  | DI   |
| 1 | 1 | 0 | 0 | ONES | ADDC |
| 1 | 1 | 0 | 1 | OR   | SUBC |
| 1 | 1 | 1 | 0 | XOR  | RSTK |
| 1 | 1 | 1 | 1 | ZERO | Reserved |

OPERATIONAL FACTORS

The external memory storage RAM 90 is used to hold programs which have to do with the transferring of data between the external memory 90, the microprocessor unit and the application dependent registers 60 where data can be transferred to selected peripheral terminals or received from selected peripheral terminals. While the application dependent register 60 can buffer and generally holds several words, it is also necessary that large batches of character transfers, such as a 1,000 character batch, will be temporarily stored or buffered in the external RAM memory 90. This is necessary since data transfers to and from the peripheral devices are very slow in comparison with the fast speed of operation of the microprocessor and the host computer.

It will be noted that the main host system 100 is connected by means of a message level interface bus 105 which, through a host adapter, not shown, connects to the application dependent registers 60. Further, as seen in FIG. 1 individual peripherals can be shown as items $109_a$ and $109_b$ which are connected to the external registers. Each of these peripherals also has an adapter unit $109_c$ which controls the peripheral terminal unit and can also be instructed by the microprocessor system through instruction words passed through application dependent registers 60.

As seen in FIGS. 2A and 2B the general control and coordination is handled by the instruction decoder-controller 23 which has connections to all of the units in the system; however, the main interconnections have been shown on the drawings which indicate control lines to the major units involved.

Since the basic function of the overall system is to control and effectuate the transfer of data between selected peripherals and the main host system, it is helpful to consult the data provided in the previously cited patents which were incorporated by reference. The system operation is initiated when the main host system 100 of FIG. 1 conveys and I/O descriptor command word on the message level interface lines 105, this command being placed into a selected application dependent register 60. As mentioned in the previously cited patent references, the main host system also provides a "descriptor link" word signal which identifies a task to be performed so that when that task is either completed or incompleted, the peripheral-controller can formulate a Result Descriptor word which can be conveyed to the main host system to inform it of the condition status as either completion or non-completion of the task to be performed and also to identify the task so that the result word data will be channeled to the proper memory location in the main host system where data concerning a given task has been located.

The microprocessor system is placed into operation by means of the "clear" signal shown in FIG. 1 at line 11, at which time it starts operations so that the first address of the program counter is used to address the program memory 50 in order to initiate the fetching the execution of instruction words.

The receipt of the I/O command descriptor word into the application dependent registers will cause the Interrupt line signal (on lines of bus 11) to be sent to instruction decoder-controller 23 whereby the microprocessor will fetch, analyze and execute operations as a result of the I/O command descriptor.

With the I/O descriptor in the application dependent register and with the Interrupt signal activated, the microprocessor will use a GET operator to get this command data from the application dependent register 60 and put it into a selected accumulator register 30 where it can then be read, analyzed and interpreted by the arithmetic logic unit (ALU 32) and its associated data manipulation circuitry so that the required operators and data will be sent again to the application dependent register 60, or the external memory 90 and such that the control logic 66 will permit the transfer of data to occur.

Assuming a Write operation (transfer from host computer system to peripheral), the I/O command descriptor from the main host system will have the address of a selected peripheral in its instructions. The address of this peripheral will also be taken on into a GET operation by the microprocessor and translated into an instruction which can then be put (PUT operation) into the peripheral (via an adapter) by using control logic 66 and selected application dependent registers 60 in order to select the desired peripheral device 109. As seen in FIG. 1 each of the peripheral devices will have an adapter $109_c$ which is associated with the peripheral device in order to control its operation and data transfers. Then the microprocessor can send appropriate instruction commands to the adapter unit of the selected peripheral such that the input line to the peripheral can be enabled and instructions can be provided by the microprocessor, for example, to take incoming data from the main host system 100 (which may be temporarily stored in the application dependent register 60 or temporarily stored in the external memory 90) and then transfer data to the selected peripheral terminal device.

For example, if the selected peripheral terminal device is a "card reader", then this peripheral unit is oriented to handle only one byte at a time so that it is then necessary for the microprocessor instructions to select only one byte at a time and to transfer the data one byte at a time from its storage in external memory into the peripheral terminal unit. On the other hand, if data, for example, is being transferred to a disk-type peripheral, which generally handles a two byte word (16 bits) then the data can be transferred in terms of "words" (symbolically designated AB) directly to the peripheral adapter and thence the peripheral disk.

Thus, it is seen that in certain situations it is necessary to select only one byte, at a time, out of a two byte word in order that one byte, at a time, can be transferred out into the peripheral which can only accept one byte at a time. In this case, if there is an accessed word AB composed of two bytes, it is then necessary for the microprocessor to select out one byte at a time for transfer to the peripheral. This is done generally by using the "low order" byte as the byte to be selected for transfer. Thus, in the word AB, the byte B would be selected for transfer to the peripheral, after which the word-byte positions AB would be byte-swapped into the word positions BA, and then the "low order" byte A could then be transferred into the peripheral terminal unit.

The I/O command descriptor may eventually wind up in a selected one of the accumulator registers 30 or in a selected external register 60 or in external memory 90. In any case it must be available from the host computer 100 so that the microprocessor can access it, analyze it and make the appropriate signals as to what further instructions must be generated.

The program counter 41 holds addresses which are used to select instruction data from the program memory 50. This program counter is reset to zero with the initiation of the "power on" signal and the clear signal.

With the initiation of the fetching of instruction words from the program memory and with the receipt of an I/O command descriptor, the command descriptor data will be transferred to an internal register of the microprocessor system, such as the accumulator register 30 where it can then be inspected and analyzed by the data manipulation circuitry (ALU 32) and the associated shift logic and byte swap circuitry 33, 34. Thus, the meaning and intent of the descriptor command can be translated into instructions for the selection of a peripheral device, through its adapter, and for a subsequent transfer of data to or from the particular peripheral terminal device.

For example, the PUT operator is generated by the microprocessor and is applied to the application dependent logic module $60_L$. An address (of a peripheral adapter and a peripheral terminal unit) will then be provided and the application dependent logic module will operate on this address to select the appropriate adapter and peripheral unit for data to be transferred. The software of the microprocessor system generates the PUT commands to the peripheral adapter.

When the microprocessor system generates a PUT operator to the application dependent logic module $60_L$, then this enables the system to operate such that the host computer will send data on message level interface 105 to selected application dependent registers 60 where it can then be transferred into and stored in the external memory 90. As the microprocessor system provides a multiple series of repeated GET operators, then each word of data (or each byte of data if the peripheral can only accept bytes) will be transferred from the external register 60 to the selected peripheral terminal.

Since the microprocessor operates much faster than the peripheral terminal, then what would generally be done is that if there is a multiple word transfer of data, is that the words would be stored in the external memory 90 and then fetched and transferred out to a selected peripheral at the slower speed with which the peripheral terminal device can accept the data. In this respect the external memory 90 acts as a storage buffer which permits the microprocessor to operate at its high speed while data can reside in the external memory 90 and then be transferred at a slower speed to the selected peripheral.

Data will be sent from external memory 90 to the peripheral terminal by the use of a PUT operator which is used to control the peripheral adapter and terminal unit. That is to say, the PUT operator will command a word to be transferred from external memory 90 into a selected external register 60 and thence the peripheral. The PUT operator always deals with full "words" (AB). For byte-oriented usage, the microprocessor generates intervening instructions to isolate a "byte" from a memory word into a selected accumulator from which a PUT operation is then executed.

The use of the memory reference register 40 is prominent here in that this register provides a source of addresses for the selection of operands and for the selection of programs which reside in the external memory 90.

In the situation of a Read operation where it is desired that a selected peripheral terminal unit will "send" data to the main memory of the host system, again the I/O descriptor command will be placed by the host computer into the application dependent register 60 which will then interrupt the microprocessor and ask it to "GET" the I/O command and to analyze and execute it. Since this is a Read operation from a selected peripheral device, the microprocessor will then generate the addresses and the transfer commands so that a particularly selected peripheral and its control adapter will be selected and the data from that particularly selected peripheral will be transferred to application dependent register 60 and thence stored temporarily in external memory 90. Then a series of GET operators will cause the transfer of the words stored in external memory 90 to the external register 60 and thence through the message level interface 105 over to the host system 100. Transfers to the host system will be done on a full word (two byte) basis, AB, in repetitive cycles since the host system can accept the complete 16 bit word AB.

In summary, a multiple number of GET operators will cause the transfer of data from the peripheral terminal unit into the external memory 90 which acts as a buffer. Then a multiple number of PUT operators will be used to transfer this data from external memory 90 to the application register 60 and thence through the message level interface to the main host system 100. The adapters $109_c$ of FIG. 1 which are supplied for each of the peripheral devices are useful in accepting commands and for controlling operations of the particular peripheral. For example, at certain times it might be necessary to rewind the tape mechanism of a tape peripheral terminal unit or to eject or slew the paper on a printing device type terminal unit, or to select a certain address sector in the disk terminal unit.

In regard to the "C" bit previously discussed at page 28 under the C field, this feature permits certain economies in the number of instructions.

Because there is only one memory reference register (MRR), loops of code which deal with multiple address ranges, such as a loop to move 'n' words from address 's' to address 'd', involve alternately loading MRR with source ('s') and destination ('d') addresses. Such loops also involve incrementing the 's' and 'd' addresses for each iteration. Without the copy (C) bit, such a loop looks like:

```
   <get # of words in accumulator A0>
   <get source address 's' in A1>
   <get destination address 'd' in A2>
L: WRTW   MRR, A1    % MRR ← Source address
   RDW    A3, M      % A3 ← Next source word
                        from memory
   ADD    A1, A1, 1  % Increment source address
                        for next time
   WRTW   MRR, A2    % MRR ← Destination address
   WRTW   M, A3      % Store source word into
                        memory from H3
   ADD    A2, A2, 1  % Increment destination address for
                        next time
   ADD    A0, A0, −1 % Decrement word counter A0
   BR     L, NZERO   % Go back to point L if not done
                        done (A0 ≠ 0)
   ─────────────────────────────────────────
   Total for loop = 8 instructions per word moved
```

Using the copy bit it is possible to combine the incrementing of the address accumulator with the setting of MRR in one step. To do so, adopting the trick of starting with 's−1' and 'd−1' in the accumulators, this is done only once:

```
         <get # of words in accumulator A0>
         <get source address 's' in A1>
         <get destination address 'd' in A2>
not   ⎛  ADD    A1, A1, −1    % A1 now contains s−1
inside⎨
loop  ⎝  ADD    A2, A2, −1    % A2 now contains d−1
L:       ADD    A1, A1, 1, C  % increment source address
                                  and copy and copy to MMR
         RDW    A3, M          % A3 ← next source word
                                  from memory
         ADD    A2, A2, 1, C  % increment destination
```

```
                                  address and address
                                  and copy to MMR
         WRTW   M, A3          % write source word into
                                  memory from A3
         ADD    A0, A0, −1    % decrement word counter
                                  A0
         BR     L, NZERO       % go back to point L if not
                                  done (A0 ≠ O)
   ─────────────────────────────────────────
   Total for loop = 6 instructions per word moved
```

Thus, it is possible to save $((8-6) * n)-2$ instructions by using move 'n' words, or $2n-2$ instructions. For 100 words, this is 198; at current speeds that equals about 50 microseconds saved for 100 words moved.

BYTE ORIENTED READ/WRITE OPERATORS

As was previously discussed, the UIO-SM has been implemented with several operators to simplify the processing of byte-oriented data even though the memory is organized in words which are two bytes wide. These particular operators work in conjunction with the memory reference register 40 of FIG. 2 which addresses external RAM data memory 90.

The byte-oriented read/write operators use the "byte-swap" feature of the UIO-SM such that the "desired" byte is always read from external memory (90) into the "low order" byte of a selected register of the destination accumulator A(D) even though the desired byte might have been in the "high" order byte of the memory location in 90. The desired byte, after being placed into the destination accumulator A(D), can then be processed. After the low order byte is processed, the high order byte of the accumulator A(D) must be updated with the other byte from the current data memory location, and then the two bytes are written into memory 90 as one word, and each byte will go into the proper position. This would be needed, for example, when a card reader peripheral is supplying only one byte of a word for each transfer operation.

In the case of byte-oriented operators, the decision whether or not to "byte-swap" is determined by the low order bit of the memory reference register 40 which, in essence, is a byte-address. The following Table XIII is an example which illustrates the use of these operators in handling sequential byte data which is stored in memory 90.

The next following Table XIV shows a sequence of instructions and the resultant signals in the memory reference register 40, the accumulator register 30 and the data memory 90. Thus, the sequence shown in Table XIV starts with loading the memory reference register 40; reading the byte (RDB); translation; read before write byte (RDBW); write byte (WRTB); incrementing the memory reference register (MRR 40); again read byte (RDB); again translate; again read before write byte (RDBW); write byte (WRTB); incrementing memory reference register 40; read byte (RDB); translate; read before write byte (RDBW); write byte (WRTB); and so on.

TABLE XIII

HANDLING SEQUENTIAL BYTE DATA

| Data Memory Address* | Memory Data (MSB$_y$-LSB$_y$***) |
|---|---|
| 0 | A  B |
| 1 | C  D |
| 2 | E  F |

TABLE XIII-continued

HANDLING SEQUENTIAL BYTE DATA

| Data Memory Address* | Memory Data (MSB$_y$-LSB$_y$***) |
|---|---|
| Sequential Data to be Processed = ABCDEF | |

*Actually, the first UIOSM instruction must be in address zero if there is no physical separation between program memory and data memory.
**MSB = Most Significant Byte, LSB = Least Significant Byte
Note: the symbols ABCD here refer to successive bytes of memory data to be processed in sequence.

TABLE XIV

EXEMPLARY SEQUENCE OF INSTRUCTIONS

| INSTRUCTION | MRR | MRRLSB* | ACCUMULATOR DATA (MSB$_y$-LSB$_y$*) | MEMORY DATA (MSB$_y$-LSB$_y$*) |
|---|---|---|---|---|
| Load MRR with starting addr of seq. data | 0 | 0 | | |
| RDB | | | O  A | |
| process (translate) | | | X  A' | |
| RDBW | | | B  A' | |
| WRTB | | | | A'  B |
| increment MRR | 0 | 1 | | |
| RDB | | | O  B | |
| process (translate) | | | X  B' | |
| RDBW | | | A'  B' | |
| WRTB | | | | A'  B' |
| increment MRR | 1 | 0 | | |
| RDB | | | O  C | |
| process (translate) | | | X  C' | |
| RDBW | | | D  C' | |
| WRTB | | | | C'  D |
| etc. | | | | |

*MRRLSB = MRR Least Significant Bit. This bit does not address memory but is used by the UIOSM to determine whether or not to byte swap on byte oriented op's.
**MSB = Most Significant Byte, LSB$_y$ = Least Significant Byte A further "byte-oriented" operator has been implemented into the UIO-SM and is illustrated in the following Table XV. This operator aids in the formation of a "two-byte" data word where the two bytes are sequentially located in data memory 90. But unless several OP's are used, it is not known whether or not the two desired bytes are in a single memory location or whether they straddle two memory locations.

The upper portion of Table XV shows the arrangement of data in a first Memory 1 and a second Memory 2 corresponding to true and false signals of the data memory address. Then the lower part of Table XV shows an exemplary sequence for the sequential instructions with reference to data in the memory reference register 40 and in the accumulator 30.

TABLE XV

| Data Memory Address | Memory Data 1 (MSB$_y$-LSB$_y$) | Memory Data 2 (MSB$_y$-LSB$_y$) |
|---|---|---|
| 0 | B  C | A  B |
| 1 | D  E | C  D |

Desired Sequential Data = CD

| INSTRUCTION | MRR | MRRLSB* | ACCUMULATOR DATA (MSB$_y$-LSB$_y$**) |
|---|---|---|---|
| Memory Data 1 Case: | | | |
| load MRR with data ending address | 1 | 0 | |
| RDB | | | O  D |
| decrement MRR | 0 | 1 | |
| RBWR | | | C  D |
| Memory Data 2 Case: | | | |
| load MRR with data ending address | 1 | 1 | |
| RDB | | | O  D |
| decrement MRR | 1 | 0 | |
| RBWR | | | C  D |

*MRRLSB = MRR least significant bit. This bit does not address memory but is used by the UIOSM to determine whether or not to byte swap on byte oriented OP's.
**MSB$_y$ = Most significant byte. LSB$_y$ = least significant byte

LINEAR MICRO-SEQUENCING

Figures 1, 2C:
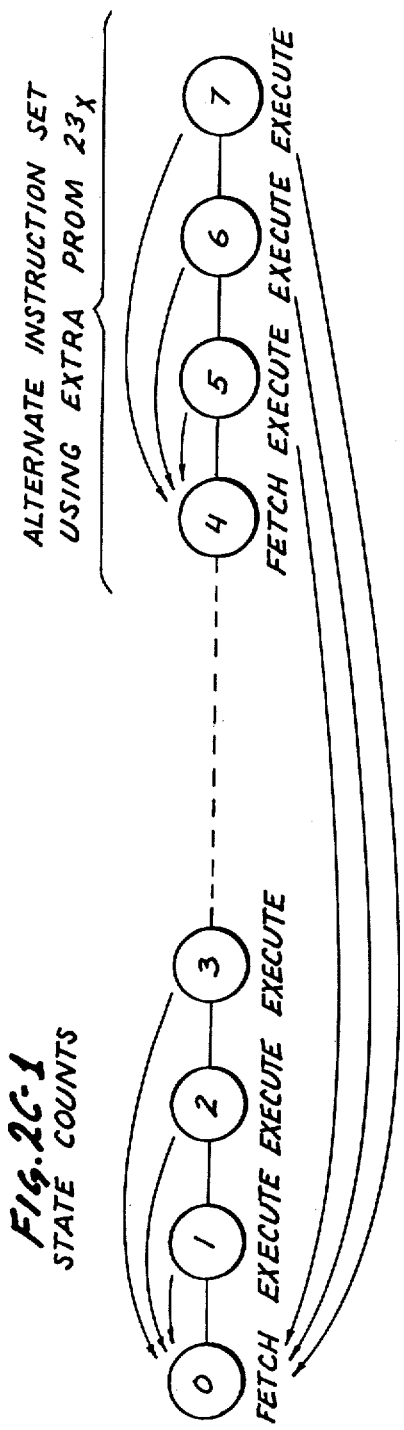
FIG. 2C is a schematic drawing of the decoder-controller with its linear sequencer circuitry.

FIG. 2C is a schematic block drawing of the Instruction Decoder 23 with its linear micro-sequencing circuit. A State Counter 23$_s$ is initiated into a Fetch operation upon receipt of a Clear signal to its input. The State Counter 23$_s$ feeds address bits to the PROM 23$_p$ which contains a set of internal micro-instructions. The PROM 23$_p$ provides one output line designated Count Enable which is used to sequence the State Counter 23$_s$.

One set of instruction signal outputs, selected from PROM 23$_p$, are a set of control terms which are conveyed to a pipeline register 23$_r$ which provides control signals to the units of the microprocessor and the application dependent logic 60$_L$. The pipeline register 23$_r$ is used (a) to synchronize the output control term signals and also (b) to delay (by one clock) an output control term so that the signal from PROM 23$_p$ will be adequately stabilized. Another set of control signal terms are provided directly from the output lines of PROM 23$_p$.

As seen by the dotted lines above PROM 23$_p$, an alternate plug-compatible PROM 23$_x$ can replace 23$_p$ and be utilized by up to two extra address lines from State Counter 23$_s$. Each line (1 bit) will permit the addressing of an alternate or added set of instructions from PROm 23$_x$ (in addition to using the original 2 bit lines).

In FIG. 2C the Instruction Register 22 provides input instructions to PROM 23$_p$. An input of 15 bits (instruction fields) is fed to Instruction Register 22 from either Program Memory 50 or external memory 90 depending on which memory has been selected as a source of data.

One register of Instruction Register 22 is dedicated to receipt of the one bit of data called the "M" bit which is placed in each instruction word (from Program Memory 50). As discussed earlier, this field (M) is the one which selects either the Program Counter 41 or the Memory Reference Register 40 as the source of addresses to be next used for the selection of data.

In FIG. 2C the Condition Select Multiplexer $23_m$ has inputs from internal flag registers 35, 36, and from external flags $23_e$ in the Application Dependent Logic $60_L$. The output of Condition Select Multiplexer $23_m$ is used to provide an input to PROM $23_p$ of the linear microsequencer. Operationally, it should be noted that, at the same time that an instruction is being decoded, there is simultaneously a Fetch of the operand, since the M bit, when set, will initiate selection of an address from Memory Reference Register 40 (or when M not set, selects Program Counter) to access data from a location in external memory 90 (or Program Memory 50).

FIG. 2C-1 is a schematic illustration indicating modes of the State Counter $23_s$. At state number 0 (upon activation of the Clear signal) a Fetch operation is initiated. Thence the "1" state is achieved where the instructions may start execution of an instruction.

After completion of the "1" state, the sequencer may return to "0" for a Fetch and proceed to the "2" state. Here an operation step can occur.

After completion of this cycle, the State Counter returns to "0" for another Fetch operation, or else sequences to state "3" which permits an additional set of operations as shown in FIG. 2C-1.

After this, the State Counter goes to "0" (or "4") for Fetch.

The remaining portions of FIG. 2C-1 showing the states "4", "5", "6" and "7" refer to the situation in FIG. 2C where an alternate larger instruction PROM $23_x$ has been used to replace $23_p$ with the extra two address lines of 1 bit each for addressing the microinstruction PROM. Here, an alternate instruction set can be accessed and sequenced, similar to the sequencing of the PROM $23_p$ using the states 0 through 3. The State Counter $23_x$ can thus be used to address and select instructions from either PROM $23_p$ or from a larger PROM $23_x$.

Referring again to FIG. 2C, the Instruction Register 22 is seen to provide a 5 bit address line to select an external register 60. There is further provided a 7 bit "source address" line and a 3 bit "destination address" line to Multiplexer $30_x$ (which is shown again in FIG. 2D). Referring to FIG. 2D, the accumulator registers 30 are seen clocked by a 8 megahertz clock, and also have a Write Enable (WE) input line coming from decoder-controller 23.

Multiplexer $30_x$ (FIG. 2D) receives input addresses (from instruction register 22) for the source of data and for the destination of data. The SELECT line to MUX $30_x$ enables the source address to be read on the first half of the clock as seen in FIG. 2E at "Read", and enables the destination address to be written on the second half of the clock at "Write". Thus, the source location of data to be processed, and the destination location, where the data is to be placed, are all accomplished in one clock (125 nanoseconds).

Referring to FIG. 2D, a latch $30_t$ is provided to the accumulator registers 30 to hold and convey data to ALU 32. The other data input to ALU 32 is from Memory Operand Register 31 which receives data and instructions along instruction bus 15 (from Program Memory 50), and/or memory data bus 12 (from external memory).

The I/O bus 10 provides a path for processed data to be fed back to accumulator registers 30 or to the external memory 90 or to the external registers 60 (of application dependent logic unit $60_L$).

Figure 2F:
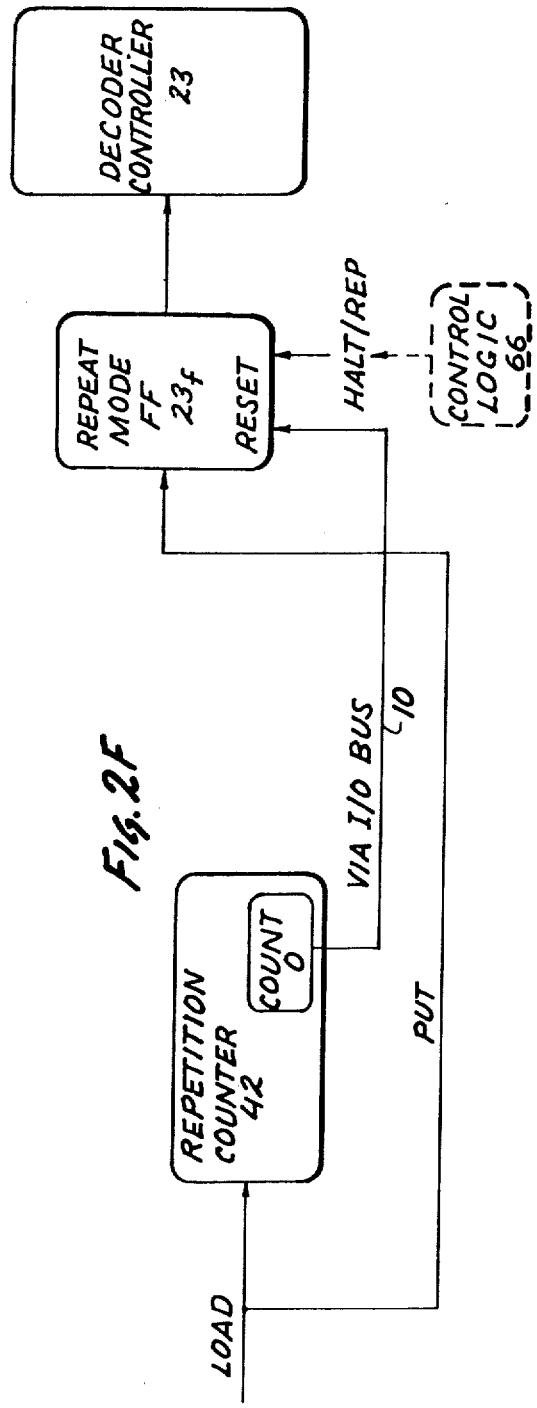
FIG. 2F is a schematic drawing illustrating the relationship between the repetition counter and repeat-mode flip-flop.

Referring to FIG. 2F, there is seen a schematic drawing showing the intercooperation of the Repetition Counter 42 and Repeat Mode Flip-Flop $23_f$ and decoder-controller 23.

When a LOAD/PUT OP occurs which loads a number N into the Repetition Counter 42, this operation also sets the Repeat Mode Flip-Flop $23_f$ which then continues to signal the decoder-controller 23 to continue iterative operations of the next instruction OP. On each iteration, the Repetition Counter is decremented. When the count therein reads "0", then a reset signal is conveyed to the Repeat Mode Flip-Flop $23_f$ to turn it off which will signal the decoder-controller 23 that the iteration is finished (or to be halted), at which time the microprocessor will then select the next instruction from Program Memory 50 (via program counter 41).

In FIG. 2F, there will be seen another line for resetting (shutting off) the Repeat Mode Flip-Flop $23_f$. This is done by using a HALT/REP signal from Control Logic 66 in the Application Dependent Logic Unit $60_L$. This could occur because Control Logic 66 has sensed an early ending in the data transfer operation.

The linear micro-sequencer enables functions to be partitioned among the various PROMs so that each PROM will handle certain functions. There is no need for a stack memory or a next address register in the micro-sequencing circuitry. The micro-sequencer lowers the need for multiple IC's and permits expansion of PROM usage with no increase in hardware.

The microprocessor system permits simplicity and time-economy with which instructions can be fetched and executed, and data fetched and manipulated for data transfer purposes can be accomplished by what may be called (1) instruction pipelining and (2) operand pipelining.

Certain overlapping operations are made to occur which provide for an exceptionally short time for instruction and operand fetch and for execution of instructions.

Thus, while the processor is fetching an instruction in one clock, on the next clock, it is storing the result data in an I/O (peripheral) device by means of the I/O bus 10, or it may be storing the result data in the external memory 90, for example. At the same time that the result data is being stored, another fetch cycle occurs which is a fetch cycle using a memory address on the address bus 16 which will then provide an output of memory data on the memory data bus 12.

Note that the external memory read path 12 is set separate from the memory write path 10 and the system can store the result data in a peripheral I/O device while at the same time reading instructions from memory.

There are basically two different lines or separate paths, one for instructions and one for operands. For example, the instruction bus 15 feeds instructions to the instruction register 22. The memory operand register 31 also can receive operands from the memory data bus 12. Thus, on one clock the instruction bus can feed instructions to the instruction register (and then to instruction decoder-controller) while on the next clock the operand can be fed to the memory operand register 31 to facilitate the execution of the instructions.

Since the address of the I/O device (peripheral) is contained in the instruction word, the system can immediately store data in the I/O device. One level of the instruction pipelining includes (a) storing result data into the internal register files (as the accumulators 30 or the external registers 60) and (b) storage of results into an I/O port adapter which connects to peripheral devices.

The operand pipeline uses the M bit. Thus, in one clock while the processor is storing result data by using the I/O bus and using an address that has already been fetched, then at the same time an instruction fetch cycle can be occurring from program memory 15, and on the next clock a decoding operation takes place simultaneously with the fetching of the operand after which on the next clock the storage of result data takes place in an addressed location.

The M bit is used as part of the operand pipeline in order to determine which source of addressing will be used—that is whether the memory reference register 40 will be used (data pointer) or whether the program counter 41 will be used (instruction pointer). This was previously discussed in the specification under the heading of Byte Oriented Read/Write operators. It may be noted that the arithmetic logic unit 32 has the one input from the memory operand register 31 while the other input is from the accumulator registers 30.

While a preferred embodiment of the disclosed invention has been described and explained, it is, of course, understood that modifications and changes may be made without departing from the concept of the invention as defined by the following claims.

What is claimed is:

1. A universal-type microprocessor system which cooperates with an application-dependent logic module to form a peripheral-controller capable of handling data transfers between main memory of a host computer and a plurality of peripheral terminal units which can be either "word-oriented" or "byte-oriented", and wherein said application-dependent logic module provides external register means having bus connections to said plurality of peripheral terminal units and to said host computer, and wherein said application-dependent logic module further includes an external memory for storage of programs related to control of said peripheral terminal units and for temporary storage of data undergoing transfer, and wherein said application-dependent logic module further includes control logic means for communicating with and controlling said external register means, said external memory and communicating with a decoder-controller in said microprocessor system, the said microprocessor system comprising:

(a) data processing means including:
 (a1) an Arithmetic Logic Unit providing an output to a shift logic circuit and to a byte-swap circuit;
 (a2) said shift logic circuit providing output to an I/O bus, said shift logic circuit functioning to rotate one or more bits of a word being processed, to the right or to the left;
 (a3) said byte-swap circuit providing output to said I/O bus, said byte-swap circuit functioning to exchange the sequential positions of the higher order byte and the lower order byte of a received two-byte word;

(b) said I/O bus providing connecting lines from said data processing means to said external register means, to said external memory, to an accumulator register means, and to an addressing means;

(c) said addressing means receiving input data from said I/O bus and storing addresses useful for accessing data from an internal memory or said external memory, said addressing means including:
 (c1) a program counter storing consecutive addresses of data located in said internal program memory;
 (c2) a memory reference register for storing addresses of data located in said external memory, and including:
  (c2-1) a memory address bus which connects to said external memory;
  (c2-2) and wherein a dedicated non-address bit in each location in said memory reference register being set to signal said decoder-controller to initiate a byte-swap operation in said byte-swap circuit, or when not-set, to pass data without a byte-swap operation;
  (c2-3) a bus connection from said memory reference register to said decoder-controller;
 (c3) an address register in said decoder-controller connecting by means of an address bus to said accumulator register means which include a plurality of accumulator registers for selection of data from/to an one of said addressed accumulator registers;

(d) said internal program memory for storing program instruction words and data words, said internal memory being addressed from said program counter and providing instruction words and data, via an instruction bus, to an instruction register and memory operand register, said internal program memory including:
 (d1) instruction words wherein each word includes a field (M) which signals said decoder-controller to select either said program counter or said memory reference register as source of the next address;

(e) register means for temporary storage of data, said register means including:
 (e1) said plurality of addressable accumulator registers which provide an output to the input of said Arithmetic Logic Unit, said accumulator registers receiving input data words from said I/O bus;
 (e2) said memory operand register for receiving operand data from said internal program memory via said instruction bus or from said external memory via a memory data bus;
 (e3) said instruction register for receiving instruction words from said internal program memory via said instruction bus or from said external memory via said memory data bus, and providing instruction words to said decoder-controller;

(f) said instruction decoder-controller receiving instruction signals from said instruction register, and including incoming and outgoing control signal lines connected to said data processing means, to said addressing means, to said register means, to said internal and external memory means, to said external registers and said control logic means, said decoder-controller further including:
 (f1) means for setting operations into one of two modes wherein a first mode, designated foreground mode, is for normal operations and a second mode, designated background mode, is for interrupt operations;

(f2) linear sequencing means for selecting microcode instructions for execution in a predetermined sequence, said sequencing means including a microcode instruction memory for storing microcode instructions, said linear sequencing means including:

(f2-1) a state counter connected to said microcode instruction memory for receiving count control signals from said microcode instruction memory, and for providing a first portion of address signals to said microcode instruction memory;

(f2-2) input control lines from said instruction register to provide a second portion of address signals to said microcode instruction memory;

(f2-3) and wherein said microcode instruction memory provides said microcode instructions for the output lines of said decoder-controller in response to said first and second address portions;

(f3) connection means for receiving control signals from said control logic in said application-dependent logic module;

(f4) address lines to said external register means for selecting a specific register;

(f5) control lines connected to said external register means for strobing address signals to said external register means;

(g) an external memory data bus for carrying data from said external memory to said instruction register and said memory operand register;

(h) and wherein said plurality of addressable accumulator registers includes:

(h1) a first set of accumulator registers, designated as foreground accumulator registers, for use during normal operations; and (h2) a second set of accumulator registers, designated as background accumulator registers, for use during interrupt operations;

(i) and wherein said decoder-controller includes: means to select an accumulator register in said first set or said second set according to whether the foreground mode or background mode is operating.

2. The microprocessor system of claim 1, which includes:

a condition select multiplexer connected to internal and external flag registers, and mode flag registers which are set to represent the normal (foreground) mode or the interrupt (background) mode of operation; and wherein said micro-instruction memory includes:
input control lines, from said condition select multiplexer, for informational data which selects microinstruction signals for operations in either the foreground or the background mode.

3. The microprocessor system of claim 2, wherein said instruction register includes:

a dedicated location, designated M-bit register, connected to receive said M-field signal, and providing a control signal output to said micro-instruction memory of initiating a control term signal which will select said program counter or said memory reference register as a source of the address of the next instruction.

4. The microprocessor of claim 2, wherein said mode flag registers include:

first and second flag registers, said first flag register, designated as the foreground flag register, for storing flag signals during normal operations and said second flag register, designated as the background flag register, for storing flag signals during interrupt operations; and wherein said microprocessor includes:

connection means from said Arithmetic Logic Unit to said first and second flag registers.

5. The microprocessor system of claim 4 which includes:

a stack memory for storing the next program counter address which was not used due to an interrupt operation, said stack memory having an input bus from said program counter and an output return bus to said program counter; a save-register for storing the next memory reference register address data which was not used due to an interrupt operation, said save-register having an input bus from said memory referene register and an output return bus to said memory reference register.

6. The microprocessor system of claim 4, wherein an I/O data transfer command word, from said main host system, is placed into a selected external register for processing by said data processing means, and which will initiate a Clear signal from said control logic to said decoder-controller to start the foreground mode of normal operations.

7. The microprocessor system of claim 6, wherein said decoder-controller further includes:

(f6) an interrupt mask register which can be set into a background (interrupt) mode by an interrupt signal from said control logic in said application dependent logic module or which can be reset into the foreground (normal) mode by a Clear signal from said control logic.

8. The microprocessor system of claim 7, wherein said instruction words include:

an ICALL instruction which transfers the next memory reference register address into the said save-register, and transfers the next program counter address into said stack memory, and wherein said interrupt signal to said decoder-controller will set said interrupt mask register to the background mode and cause selection of an ICALL instruction.

9. The microprocessor system of claim 8, wherein said ICALL instruction causes said decoder-controller to generate an acknowledge (ACK) signal to said external register means and to said external memory to signal that the interrupt has been accepted.

10. The microprocessor system of claim 9, wherein, after receipt of said ACK signal, said application dependent logic module transmits an interrupt call address onto said I/O bus for loading into said program counter for execution.

11. The microprocessor system of claim 10, wherein said instruction words further include:

an IRET instruction word for transferring the top value in said stack memory into said program counter and for transferring the contents of said save-register into said memory reference register.

12. The microprocessor system of claim 11, wherein said IRET instruction reactivates the use of the said foreground accumulator registers and the said foreground flag register.

* * * * *